US012058487B2

(12) United States Patent
Ohara

(10) Patent No.: US 12,058,487 B2
(45) Date of Patent: Aug. 6, 2024

(54) SOUND OUTPUT DEVICE

(71) Applicant: SONY GROUP CORPORATION, Tokyo (JP)

(72) Inventor: Masaaki Ohara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 167 days.

(21) Appl. No.: 17/635,661

(22) PCT Filed: Jul. 15, 2020

(86) PCT No.: PCT/JP2020/027481
§ 371 (c)(1),
(2) Date: Feb. 15, 2022

(87) PCT Pub. No.: WO2021/039171
PCT Pub. Date: Mar. 4, 2021

(65) Prior Publication Data

US 2022/0295168 A1 Sep. 15, 2022

(30) Foreign Application Priority Data

Aug. 23, 2019 (JP) ................................ 2019-153036

(51) Int. Cl.
*H04R 1/10* (2006.01)

(52) U.S. Cl.
CPC ......... *H04R 1/1016* (2013.01); *H04R 1/1025* (2013.01); *H04R 1/1041* (2013.01)

(58) Field of Classification Search
CPC .. H04R 2225/021–0216; H04R 1/1016; H04R 1/105; H04R 25/656;
(Continued)

(56) References Cited

U.S. PATENT DOCUMENTS 10,798,500 B1 * 10/2020 Shi ......................... H04R 25/02
2008/0170734 A1 * 7/2008 Major .................. H04R 25/656
381/322
(Continued)

FOREIGN PATENT DOCUMENTS

JP 49-60719 U 5/1974
JP 2012-234627 A 11/2012
(Continued)

OTHER PUBLICATIONS

International Search Report and Written Opinion of PCT Application No. PCT/JP2020/027481, issued on Oct. 20, 2020, 09 pages of ISRWO.

*Primary Examiner* — Mark Fischer
(74) *Attorney, Agent, or Firm* — CHIP LAW GROUP

(57) ABSTRACT

A sound output device includes a main device portion that incorporates at least a battery and that is positioned behind an auricle, a sound output portion that incorporates at least a speaker and that is positioned in front of the auricle, a connection portion that connects the main device portion and the sound output portion to each other and that is positioned to run up along an ear lobe, and a joint that is removably attached to the sound output portion, that has a sound emitting opening, and that guides sound output from the speaker to an external acoustic opening, in which the joint for one of a left ear or a right ear is mounted on the sound output portion.

14 Claims, 14 Drawing Sheets

(58) Field of Classification Search
CPC .......... H04R 1/10–1091; H04R 5/0355; H04R 2201/10–109
See application file for complete search history.

(56) References Cited

U.S. PATENT DOCUMENTS

| | | | | |
|---|---|---|---|---|
| 2009/0245558 | A1* | 10/2009 | Spaulding | H04R 25/656<br>381/328 |
| 2012/0082331 | A1* | 4/2012 | Meosky | H04R 25/65<br>381/328 |
| 2013/0266170 | A1* | 10/2013 | Yamagishi | H04R 1/2873<br>381/353 |
| 2014/0205125 | A1* | 7/2014 | Triato | H04R 1/105<br>381/330 |
| 2015/0189419 | A1* | 7/2015 | Davie | H04R 1/1041<br>381/381 |
| 2018/0317030 | A1* | 11/2018 | Troelsen | H04R 25/554 |
| 2021/0195310 | A1* | 6/2021 | Kim | H04R 1/1016 |

FOREIGN PATENT DOCUMENTS

| | | |
|---|---|---|
| JP | 2017-125937 A | 7/2017 |
| JP | 2018-186557 A | 11/2018 |

* cited by examiner

SOUND OUTPUT DEVICE

CROSS REFERENCE TO RELATED APPLICATIONS

This application is a U.S. National Phase of International Patent Application No. PCT/JP2020/027481 filed on Jul. 15, 2020, which claims priority benefit of Japanese Patent Application No. JP 2019-153036 filed in the Japan Patent Office on Aug. 23, 2019. Each of the above-referenced applications is hereby incorporated herein by reference in its entirety.

TECHNICAL FIELD

The present technology relates to a technical field on a sound output device that is worn on an ear to be used.

BACKGROUND ART

There have been sound output devices that are worn on ears to be used as headphones or earphones and configured to output sound from speakers, and the sound output devices have been increasingly used outdoors in addition to indoor use in recent years. A sound output device incorporates, for example, a speaker configured to output sound and a control board configured to control the drive of the speaker and the like.

As such a sound output device, there is a sound output device that is worn on one of the left ear or the right ear to be used (see PTL 1). The sound output device described in PTL 1 is provided as an earphone and incorporates an electroacoustic element that functions as a speaker.

CITATION LIST

Patent Literature

[PTL 1]
JP 2018-186557A

SUMMARY

Technical Problem

Incidentally, with regard to human ears, angles of the left ear and right ear with respect to a face portion are different from each other. Thus, with regard to a sound output device that is worn on one of the ears to be used, it is necessary to select whether to wear a predetermined left ear-specific sound output device on the left ear or to wear a predetermined right ear-specific sound output device on the right ear.

However, the user may want to select which ear to wear the sound output device, depending on usage environment or user's convenience, and if the user cannot make a selection in such a case, the user may feel inconvenience. For example, in a case where the user has injured one of the ears, it is desired that the sound output device be worn on the non-injured ear, and in a case where the user is hard of hearing in one of the ears, it is desired that the sound output device be worn on the well-hearing ear.

Meanwhile, to eliminate such inconvenience, it is conceivable to provide, to users, a left ear-specific sound output device and a right ear-specific sound output device as a pair. In this case, however, the two sound output devices need to be manufactured individually, resulting in rise in manufacturing cost.

Thus, it is an object of a sound output device of the present technology to enhance the usability without causing rise in manufacturing cost.

Solution to Problem

First, according to the present technology, there is provided a sound output device including a main device portion that incorporates at least a battery and that is positioned behind an auricle, a sound output portion that incorporates at least a speaker and that is positioned in front of the auricle, a connection portion that connects the main device portion and the sound output portion to each other and that is positioned to run up along an ear lobe, and a joint that is removably attached to the sound output portion, that has a sound emitting opening, and that guides sound output from the speaker to an external acoustic opening, in which the joint for one of a left ear or a right ear is mounted on the sound output portion.

With this, with the joint for one of a left ear or a right ear mounted on the sound output portion, the sound output device can be worn on one of the left ear or the right ear.

Secondly, in the above-mentioned sound output device, the joint is desirably rotatable with respect to the sound output portion in a direction about a virtual axis extending in an attaching/removing direction.

With this, the angle of the sound emitting opening can be adjusted with respect to the sound output portion, and the positions of the main device portion, the sound output portion, and the connection portion with respect to the auricle can be adjusted.

Thirdly, in the above-mentioned sound output device, an output direction of the sound from the speaker is desirably set to an obliquely upward and backward direction, and the sound output from the speaker is desirably guided by the joint to a direction different from the output direction.

With this, the sound output from the speaker in the obliquely upward and backward direction is guided by the joint to the direction different from the output direction to be output from the sound emitting opening to the external acoustic opening.

Fourthly, in the above-mentioned sound output device, the joint desirably includes a joint main body portion formed into a cylindrical shape and a support portion that is formed into a curved shape and that is hung on an inferior crus of an antihelix.

With this, the joint is held on the ear with the curved support portion, which is provided to the joint, hung on the inferior crus of the antihelix.

Fifthly, in the above-mentioned sound output device, the joint main body portion and the support portion are desirably integrally formed.

With this, the joint main body portion and the support portion are not provided as individual components.

Sixthly, in the above-mentioned sound output device, the support portion is desirably elastically deformable.

With this, the support portion can be elastically deformed to be hung on the inferior crus of the antihelix.

Seventhly, in the above-mentioned sound output device, the joint desirably includes a cylindrical inner member that is placed inside the joint main body portion, and hardness of the inner member is desirably higher than hardness of the joint main body portion.

With this, the joint main body portion, which serves as the outer side of the joint and has low hardness, can be brought into contact with the ear and the joint is reinforced by the inner member.

Eighthly, in the above-mentioned sound output device, a control board is desirably placed inside the main device portion, and an operation button for executing a predetermined function is desirably placed on the main device portion.

With this, the main device portion includes, in addition to the battery, the control board and the operation button, so that the sound output portion that is positioned in front of the auricle can be reduced in size.

Ninthly, in the above-mentioned sound output device, a plurality of the operation buttons is desirably placed on the main device portion, and the plurality of the operation buttons is desirably arranged to be adjacent to one another while partially protruding from a peripheral surface of the main device portion.

With this, the user can blindly operate a desired operation button by tracing the peripheral surface of the main device portion with his/her finger.

Tenthly, in the above-mentioned sound output device, in which an antenna configured to receive a sound signal is desirably placed inside the connection portion.

With this, the antenna is placed inside the connection portion that is positioned to run up along the ear lobe, so that the antenna is prevented from being covered by the ear.

Eleventhly, in the above-mentioned sound output device, in which a holding supporter that includes a coupling portion coupled to the connection portion and that is positioned to run down along a helix is desirably provided.

With this, the holding supporter connected to the connection portion can be hung on the base of the ear near the temporal region, so that the sound output device is worn on the ear with the support of the holding supporter.

Twelfthly, in the above-mentioned sound output device, the coupling portion is desirably slidable with respect to the connection portion.

With this, the position of the holding supporter with respect to the ear can be adjusted by changing the position of the connection portion with respect to the coupling portion.

Thirteenthly, in the above-mentioned sound output device, the main device portion desirably includes a charging terminal that is connected to a connection terminal of a charger, the charger desirably includes a magnet, and the main device portion desirably includes a magnetic member that is attracted to the magnet.

With this, the magnetic member is attracted to the magnet when the sound output device is connected to the charger.

Fourteenthly, in the above-mentioned sound output device, in which an earpad is desirably removably attached to the joint, and the earpad desirably has formed therein a sound passing hole that functions as a passage for sound output from the sound emitting opening and an input hole capable of receiving external sound.

With this, sound generated in an external environment is input to the ear canal from the input hole formed in the earpad, so that the sound generated in the external environment can be heard together with the sound output from the speaker.

DESCRIPTION OF EMBODIMENT

Now, a mode for carrying out a sound output device of the present technology is described with reference to the accompanying drawings.

<Structure of Ear>

Figure 1:
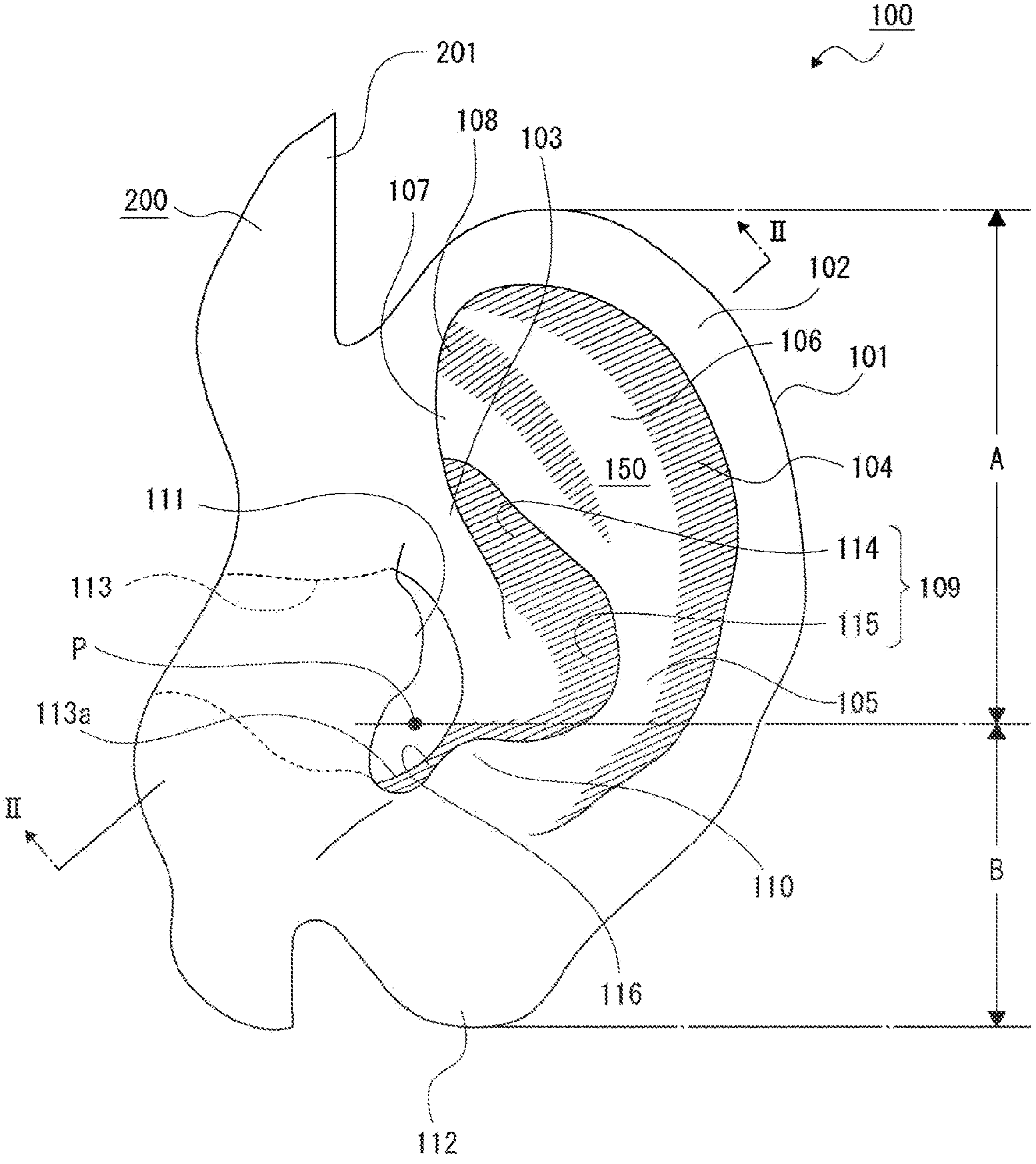
FIG. 1 illustrates an embodiment of a sound output device of the present technology together with FIG. 2 to FIG. 16, and is a perspective view of an ear on which the sound output device is worn.
Figure 2:
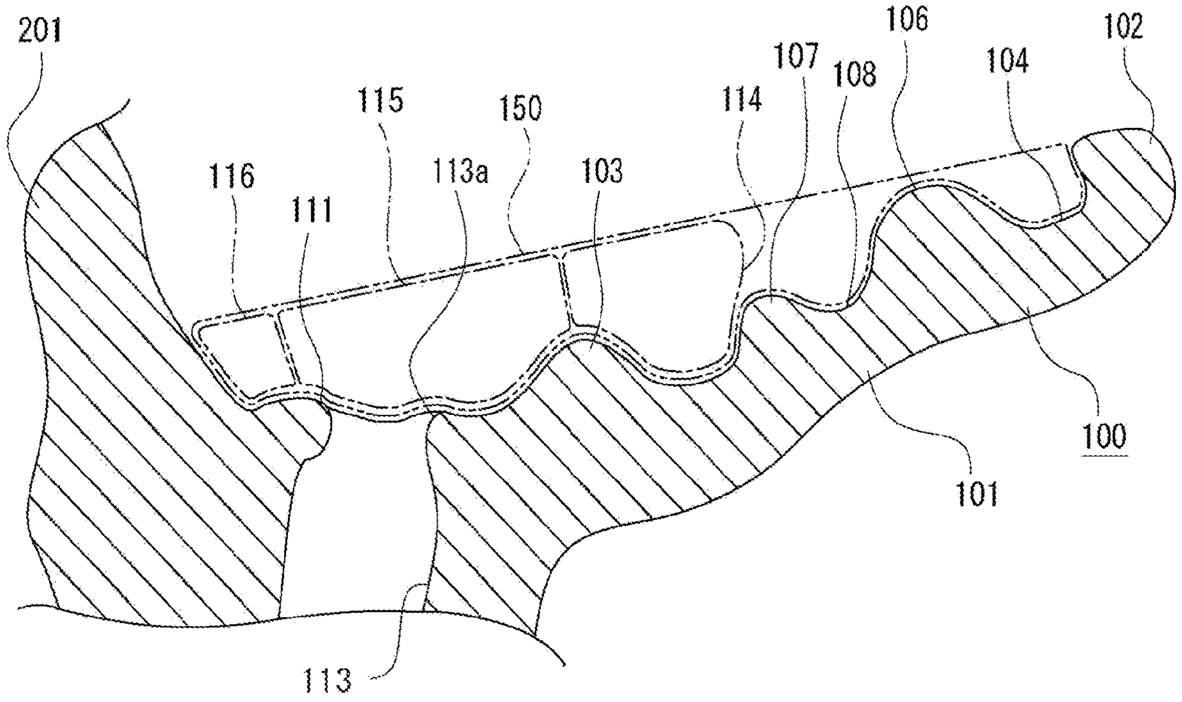
FIG. 2 is a sectional view taken along a line II-II of FIG. 1.

First, a structure of an ear on which the sound output device is worn is described (see FIG. 1 and FIG. 2).

Ears 100 and 100 are part of a head 200 and each include an auricle 101 or 101 and parts located inside the head 200, such as an eardrum, semicircular canals, and a cochlea. The portions of the head 200 that are positioned on the inner sides of the auricles 101 and 101 are temporal regions 201 and 201, and the auricles 101 and 101 each protrude leftward or rightward from the temporal region 201 or 201.

The auricle 101 has a shallow recessed shape opening substantially leftward or substantially rightward as a whole to have an inner space 150. The auricle 101 has, as its peripheral portion, a portion called a helix 102 and a projecting portion called a crus of a helix 103. The crus of the helix 103 is continuous with the helix 102 and positioned near the temporal region 201.

The portion on the inner side of the helix 102 is called a scapha 104 having a recessed shape, and the substantially lower half portion on the inner side of the scapha 104 is called an antihelix 105 having a projecting shape. A bifurcated projecting portion continuous with the antihelix 105 is positioned above the antihelix 105. Of the bifurcated portion, an outer-side portion and an inner-side portion are called a superior crus of an antihelix 106 and an inferior crus of an antihelix 107, respectively. A portion between the superior crus of the antihelix 106 and the inferior crus of the antihelix 107 is called a triangular fossa 108 having a recessed shape, and a portion on the inner sides of the antihelix 105 and the inferior crus of the antihelix 107 is called an ear concha 109 having a recessed shape.

A portion that is continuous with a lower part of the antihelix 105 and slightly bulges toward the temporal region 201 is called an antitragus 110. A portion on the temporal region 201 side that faces the antitragus 110 and slightly bulges toward the antitragus 110 is called a tragus 111, and a lower end portion continuous with a lower part of the helix 102 is called an ear lobe 112.

An external acoustic opening 113*a* that is an entrance of an ear canal 113 is positioned between the antitragus 110 and the tragus 111, and the ear canal 113 communicates with the eardrum, the semicircular canals, and the like.

Of the inner space 150, a space surrounded by the inferior crus of the antihelix 107 and the crus of the helix 103 is called a cymba concha 114, and a space under the cymba concha 114 is called a cavity of a concha 115. The cymba concha 114 and the cavity of the concha 115 are the parts of the ear concha 109. The cavity of the concha 115 communicates with the external acoustic opening 113*a* of the ear canal 113. A U-shaped open space of the inner space 150 that is continuous with a lower part of the cavity of the concha 115 is called an intertragic notch 116.

The inner space 150 of the auricle 101 is the space including the cymba concha 114, the cavity of concha 115, and the intertragic notch 116, and a lateral space of the scapha 104, the antihelix 105, the superior crus of the antihelix 106, the inferior crus of the antihelix 107, and the triangular fossa 108.

The ears 100 of humans are different in shape, size, and angle between individuals. It is, however, known that, when a distance A from a center P of the external acoustic opening 113*a* to an upper end of the helix 102 and a distance B from the center P to a lower end of the ear lobe 112 are compared to each other (see FIG. 1), the distance B has a smaller individual difference than the distance A.

<Overall Configuration of Sound Output Device>

Next, the configuration of a sound output device 1 is described (see FIG. 3 to FIG. 13). The sound output device 1 is worn on one of the left ear 100 or the right ear 100, for example.

The sound output device 1 can be used indoors and outdoors and can also be used during various exercises (sports) and the driving of vehicles such as a bicycle and a motorcycle. In particular, the sound output device 1 can also be used for, other than water sports and winter sports, competitive sports such as baseball, soccer, and golf.

The sound output device 1 includes a device main body 2 and a joint 3, and the joint 3 for a left ear or a joint 3A for a right ear is removably attached to the device main body 2 (see FIG. 3 to FIG. 8). Thus, the joint 3 for a left ear or the joint 3A for a right ear is attached to the device main body 2 in a replaceable manner, and the joint 3 for a left ear or the joint 3A for a right ear is mounted on the device main body 2.

Figure 3:
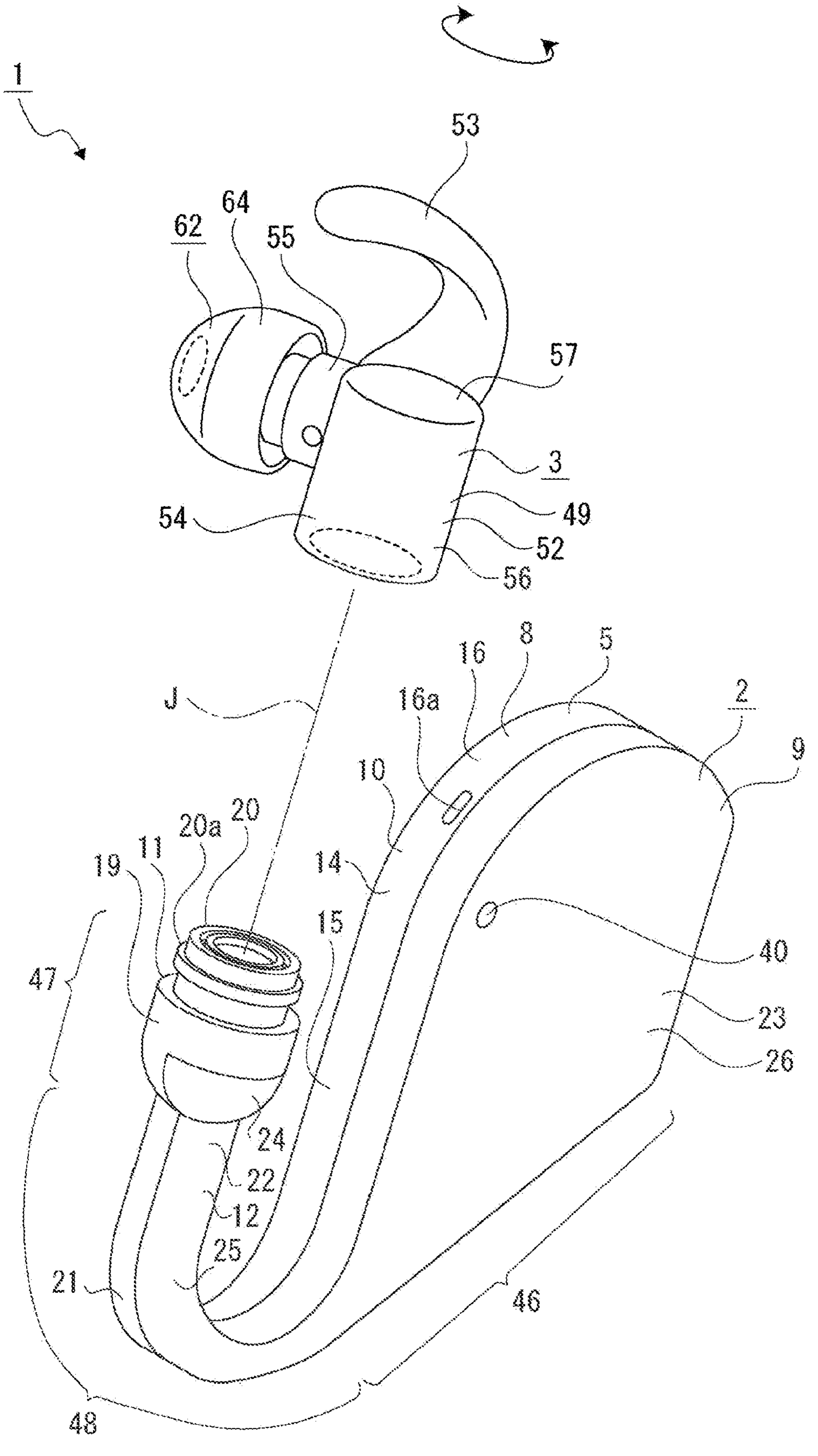
FIG. 3 is a perspective view of the sound output device, illustrating a device main body and a left ear joint separated from each other.
Figure 4:
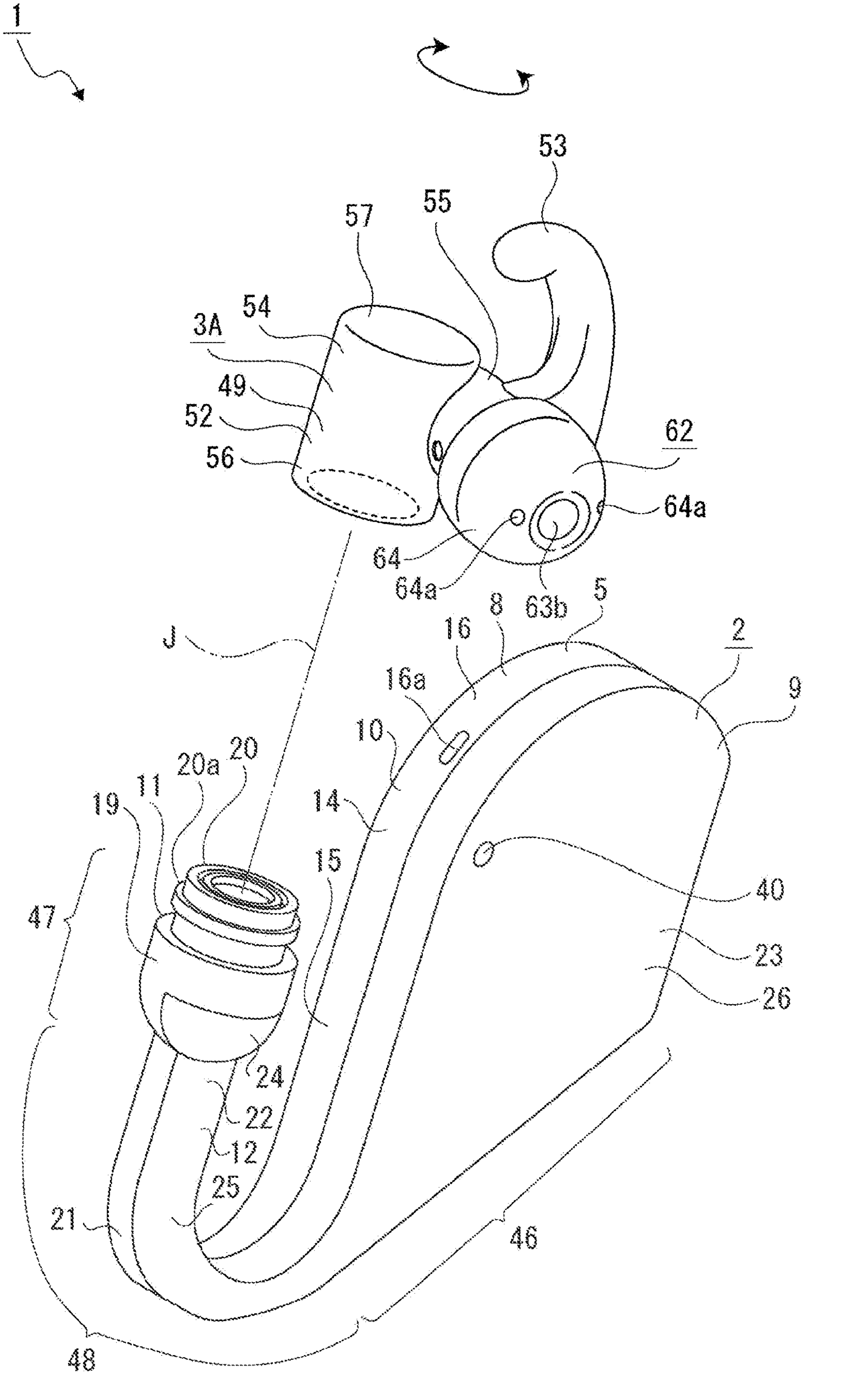
FIG. 4 is a perspective view of the sound output device, illustrating the device main body and a right ear joint separated from each other.
Figure 5:
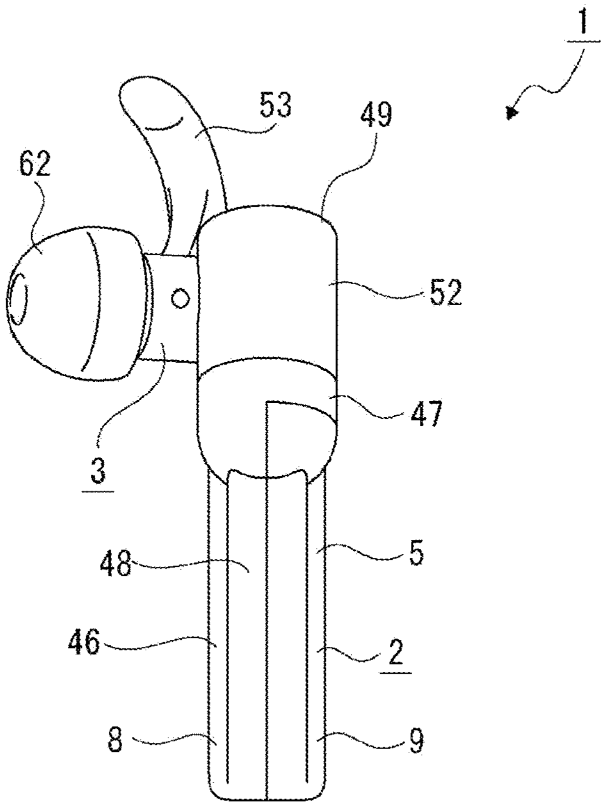
FIG. 5 is a front view of the sound output device on which the left ear joint is mounted.
Figure 6:
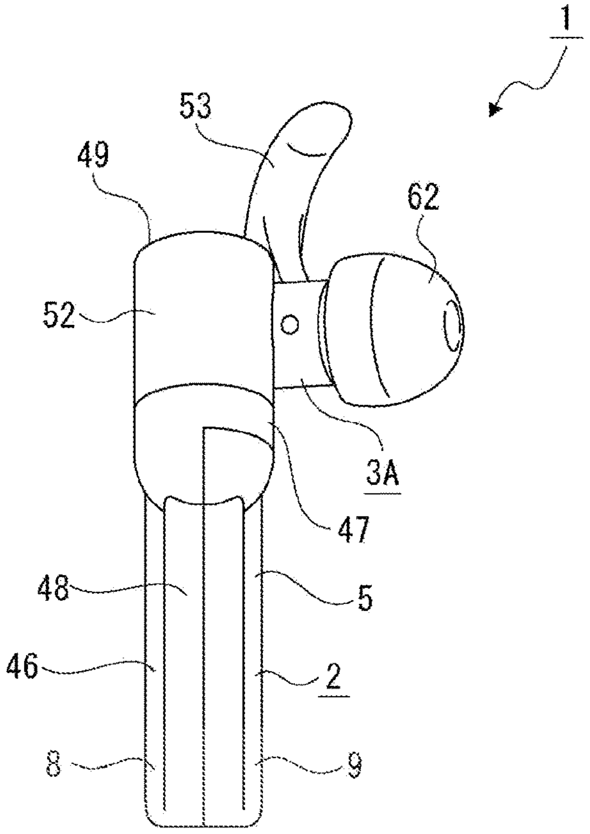
FIG. 6 is a front view of the sound output device on which the right ear joint is mounted.
Figure 7:
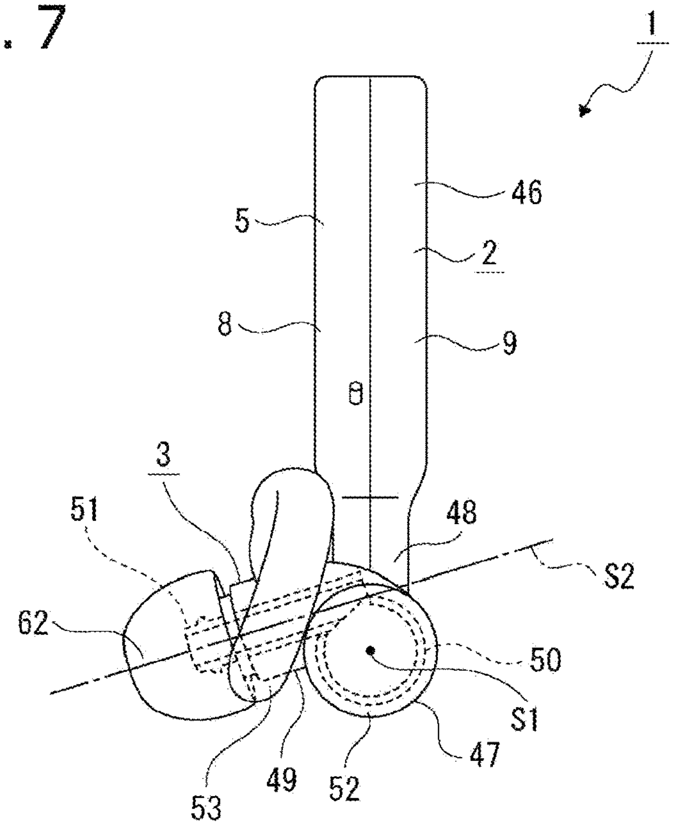
FIG. 7 is a plan view of the sound output device on which the left ear joint is mounted.
Figure 8:
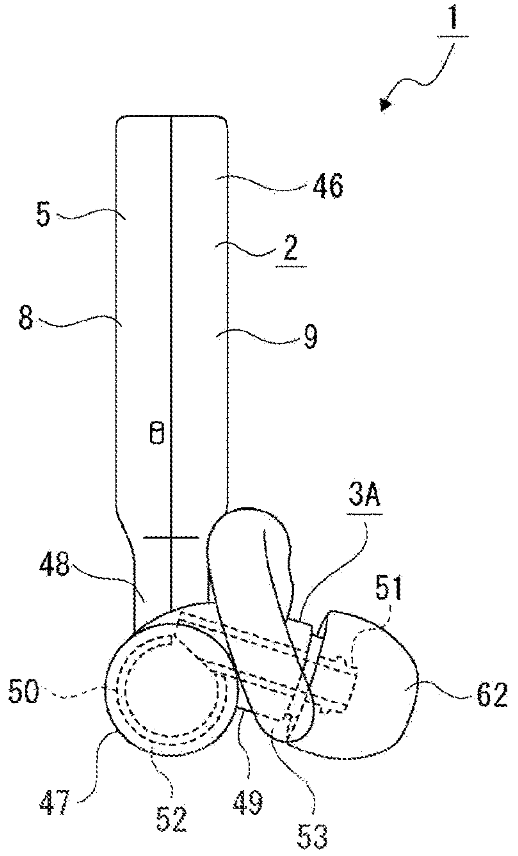
FIG. 8 is a plan view of the sound output device on which the right ear joint is mounted.

The sound output device 1 can be worn on the left ear 100 with the joint 3 for a left ear mounted on the device main body 2 (see FIG. 3, FIG. 5, and FIG. 7). The sound output device 1 can be worn on the right ear 100 with the joint 3A for a right ear mounted on the device main body 2 (see FIG. 4, FIG. 6, and FIG. 8).

<Configuration of Device Main Body>

The device main body 2 includes a housing 4 incorporating necessary components (see FIG. 9 to FIG. 12). Note that, in the following, unless otherwise particularly described, the configuration of the sound output device 1 including the device main body 2 having mounted thereon the joint 3 for a left ear is described.

Note that the configuration of the sound output device 1 is described below with directions based on the positions of the parts of the ear 100. Thus, front-back, up-down, and left-right directions of the sound output device 1 are determined with the following positional relations: the tragus 111 is positioned in front of the cavity of the concha 115, the ear lobe 112 is positioned in a lower part, and the external acoustic opening 113*a* is positioned on an outer side of the ear canal 113 in the left-right direction.

The housing 4 includes a case 5, a chassis 6, and a cabinet 7, and the case 5 includes a first case portion 8 and a second case portion 9 that are coupled to each other.

The first case portion 8 is positioned closer to the ear 100 than the second case portion 9 is in the left-right direction, and includes a base placing portion 10, a speaker placing portion 11, and an antenna placing portion 12 that are integrally formed.

Figure 10:
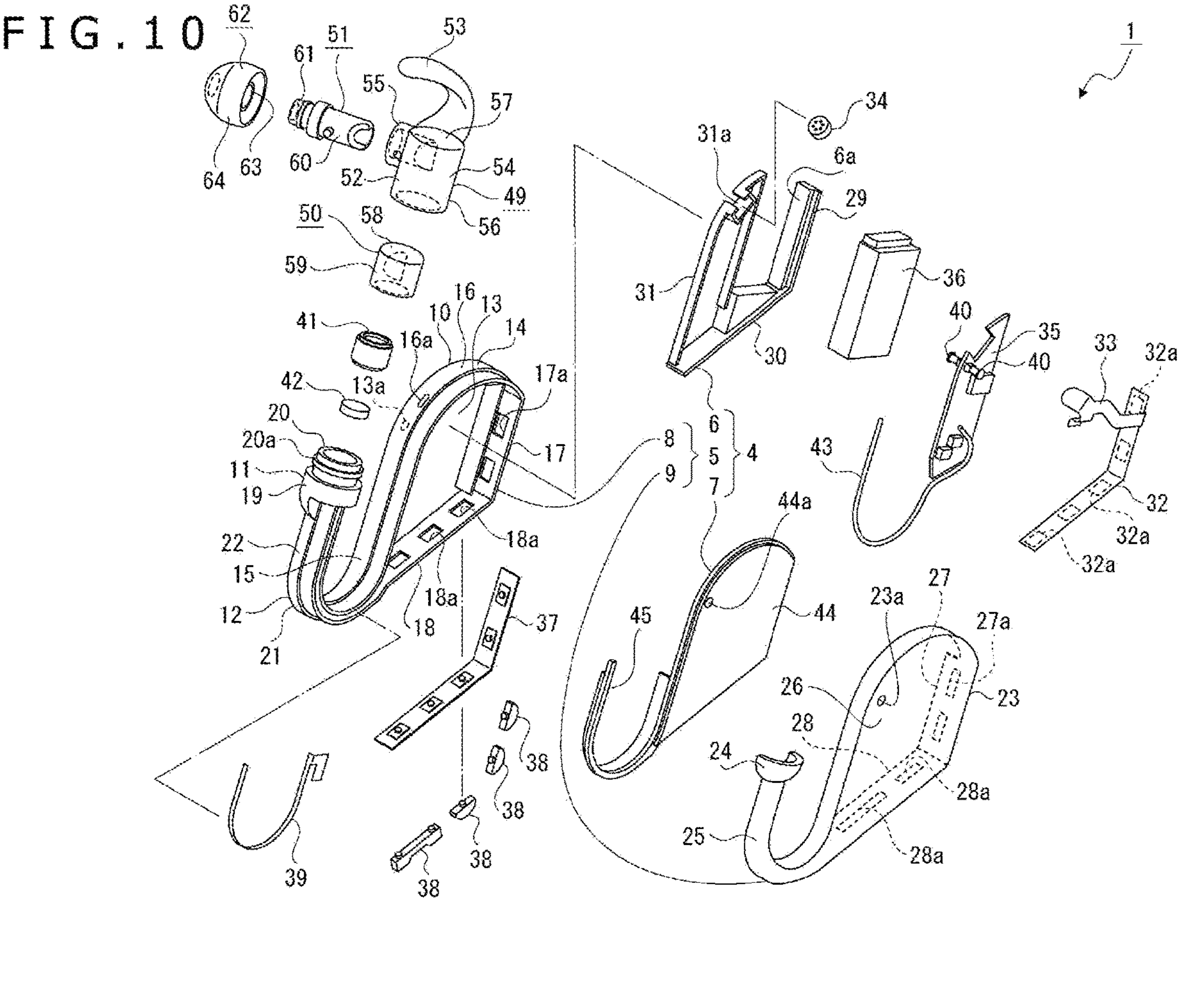
FIG. 10 is an exploded perspective view of the sound output device.

The base placing portion 10 is formed into a laterally open box shape and includes a base surface portion 13 facing the left-right direction and a peripheral portion 14 laterally protruding from the peripheral edge of the base surface portion 13 (see FIG. 10). A terminal placing hole 13*a* is formed in an upper end portion of the base surface portion 13. The peripheral portion 14 includes a slope portion 15 having a slight inclination with respect to the front-back direction, a curved surface portion 16 formed into a curved surface shape projecting upward, a first planar portion 17 facing the front-back direction, and a second planar portion 18 facing the up-down direction that are continuous in this order in a circumferential direction (see FIG. 10 and FIG. 12). A microphone hole 16*a* is formed in the curved surface portion 16, and the first planar portion 17 and the second planar portion 18 have button holes 17*a* and 17*a* or 18*a*, 18*a* and 18*a* formed separately in the circumferential direction.

The speaker placing portion 11 is formed into a substantially cylindrical shape and positioned in front of the base placing portion 10. The speaker placing portion 11 includes a base cylindrical portion 19 having the largest diameter and a mounting cylindrical portion 20 protruding substantially upward from a peripheral portion of the base cylindrical portion 19. The mounting cylindrical portion 20 is provided with a flanged mounting protruding portion 20*a* projecting outward. An axial direction of the speaker placing portion 11 is set to an obliquely upward and backward direction.

The antenna placing portion 12 includes a curved portion 21 formed into a semi-circular shape projecting substantially downward and a linear portion 22 continuous with one end of the curved portion 21. The other end of the curved portion 21 is continuous with a lower end portion of a front end of the base placing portion 10. The antenna placing portion 12 is formed into a laterally open shape and has an internal space communicating with an internal space of the base placing portion 10 and an internal space of the speaker placing portion 11.

Figure 9:
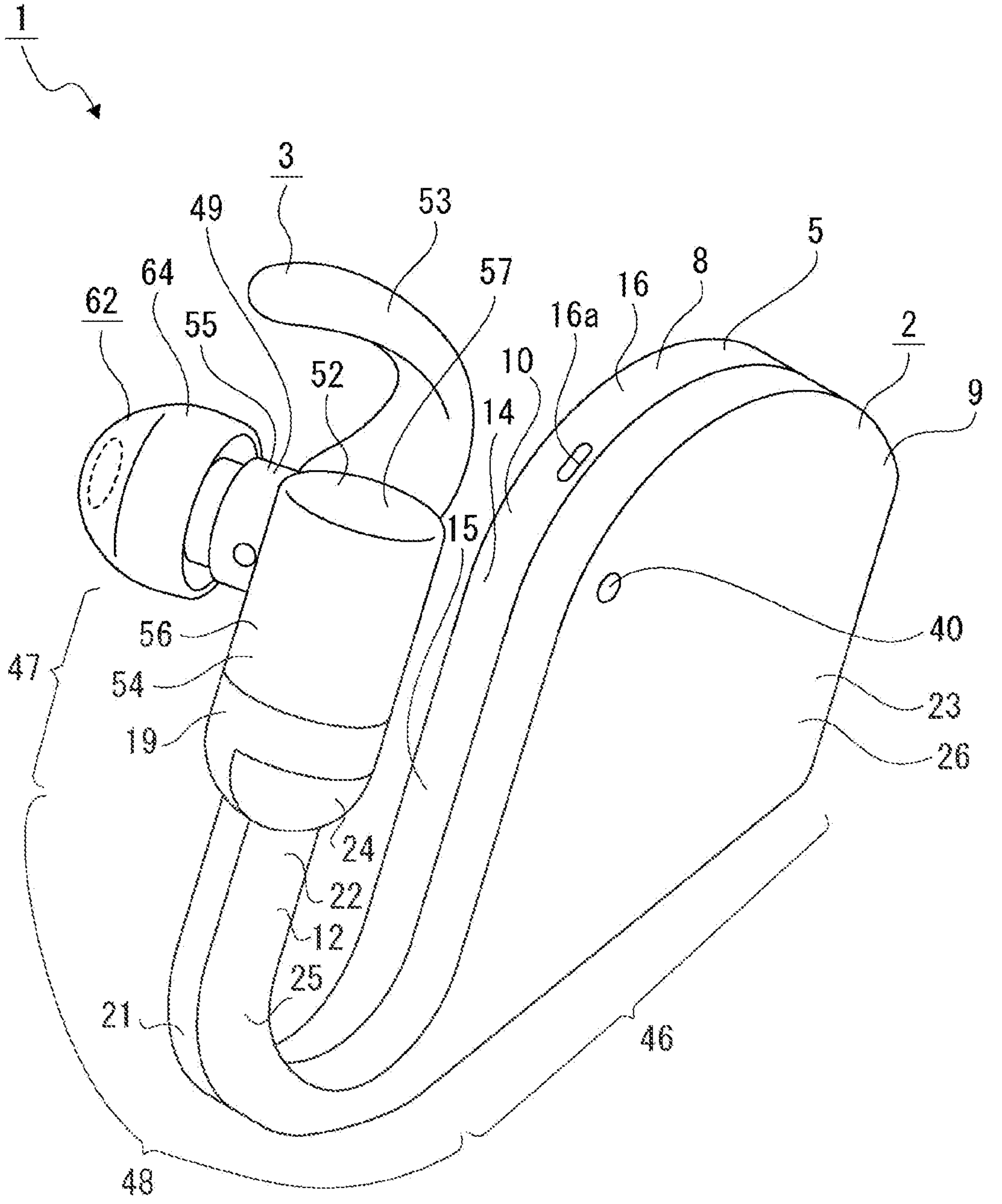
FIG. 9 is a perspective view of the sound output device.
Figure 11:
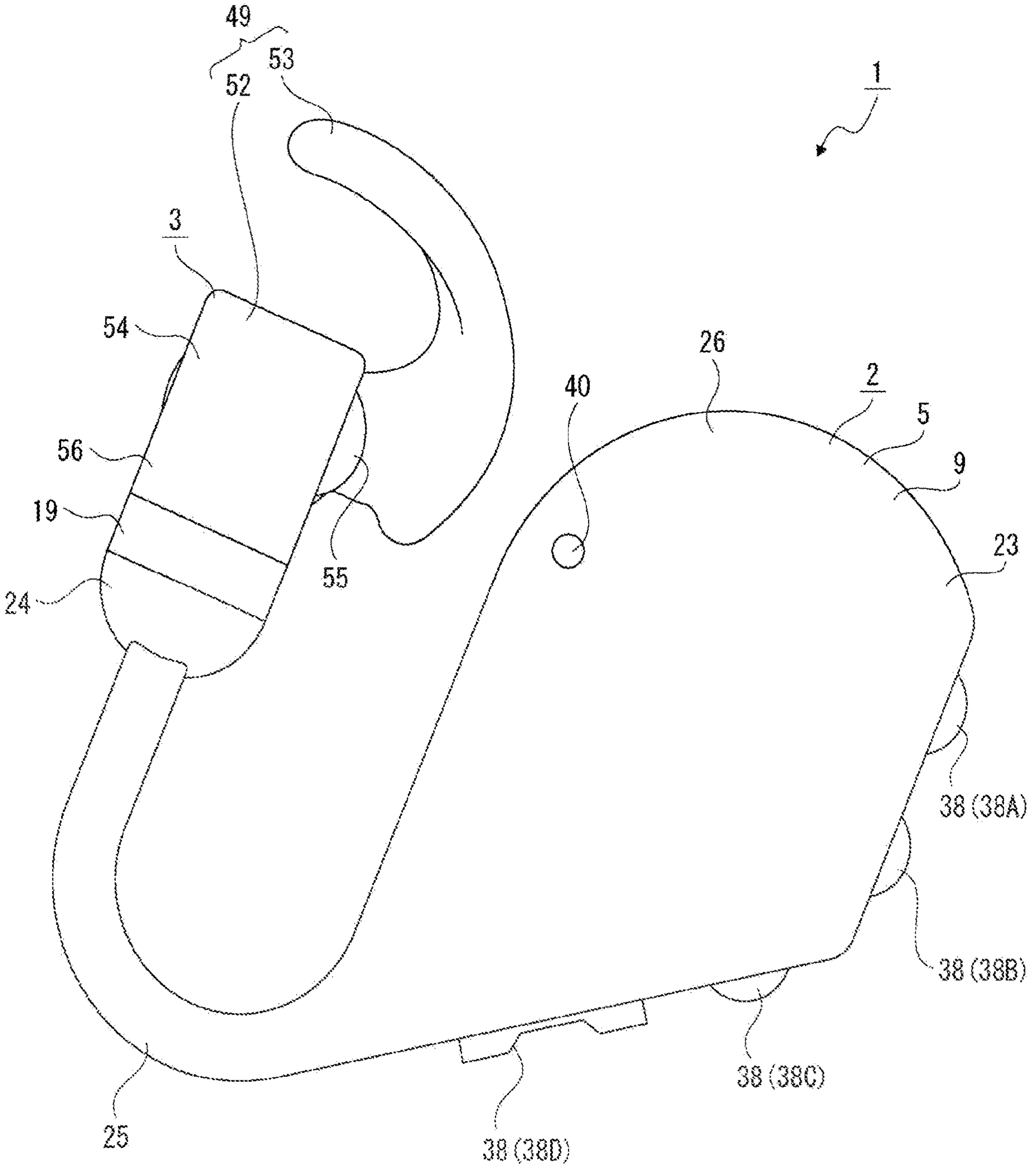
FIG. 11 is a side view of the sound output device.

The second case portion 9 includes a main cover portion 23 formed in shape and size corresponding to the base placing portion 10, a speaker cover portion 24 that is coupled to the speaker placing portion 11, and an antenna cover portion 25 formed in shape and size corresponding to the antenna placing portion 12, the main cover portion 23, the speaker cover portion 24, and the antenna cover portion 25 being integrally formed (see FIG. 9 to FIG. 11). The main cover portion 23 includes an opposing surface portion 26 that is opposed to the base surface portion 13 and a first button placing surface portion 27 and a second button placing surface portion 28 that laterally protrude from the respective portions of the peripheral edge of the opposing surface portion 26. The first button placing surface portion 27 is positioned to be opposed to the first planar portion 17 and the second planar portion 18. The first button placing surface portion 27 and the second button placing surface portion 28 have holes 27*a* and 27*a* or 28*a*, 28*a*, and 28*a* formed separately in the circumferential direction.

Figure 12:
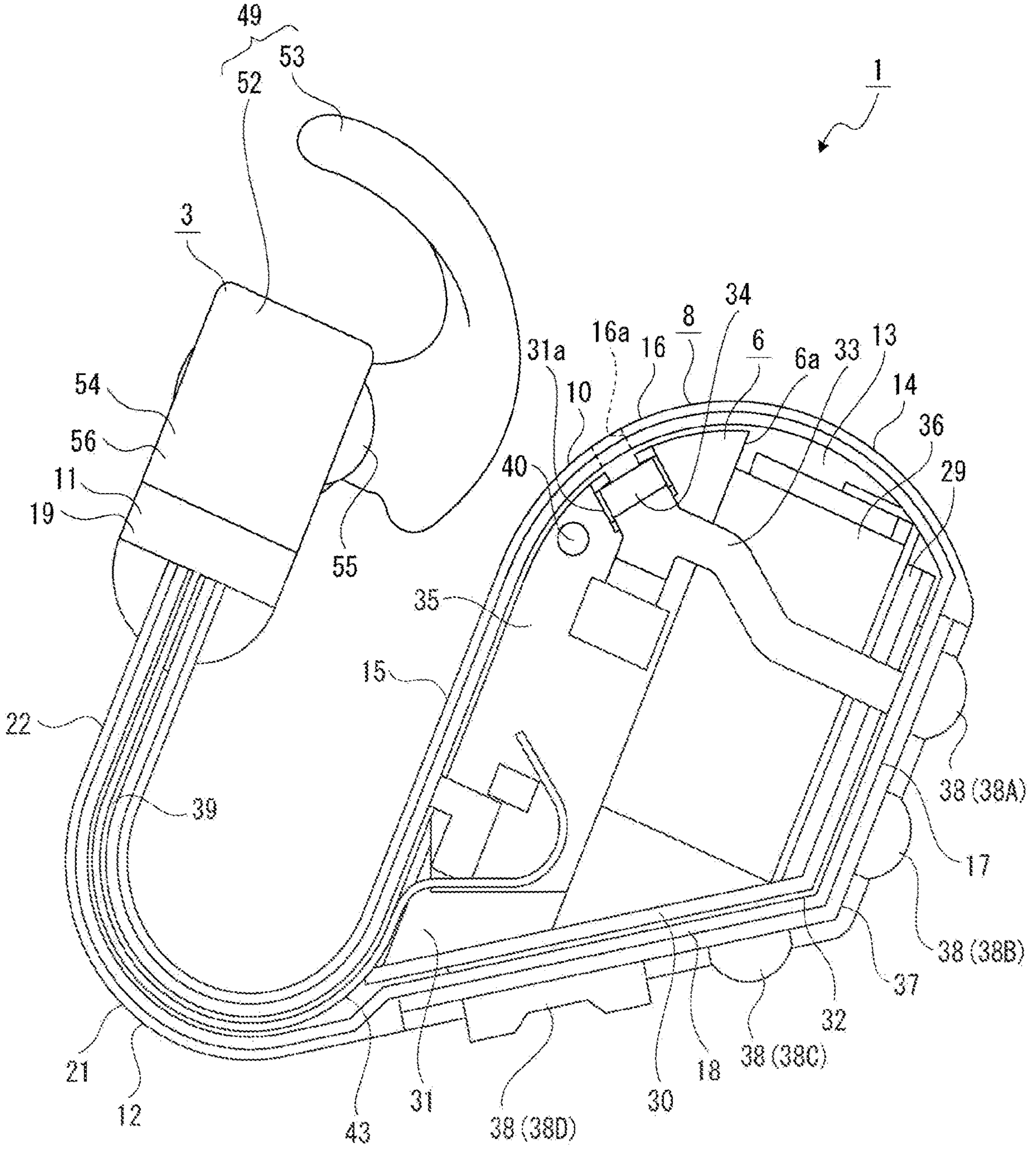
FIG. 12 is a side view illustrating an internal structure of the sound output device.

The chassis 6 is placed inside the base placing portion 10 of the first case portion 8 (see FIG. 10 and FIG. 12). The chassis 6 includes a first board mounting portion 29 facing a substantially front-back direction and extending substantially vertically, a second board mounting portion 30 protruding substantially forward from a lower end portion of the first board mounting portion 29, and a third board mounting portion 31 protruding substantially upward from the substantially front half portion of the second board mounting portion 30. The third board mounting portion 31 is formed into a substantially vertically long plate shape facing the left-right direction. The chassis 6 has a space formed between the first board mounting portion 29 and the third board mounting portion 31, and this space is a battery placing space 6*a*. A microphone placing portion 31*a* is formed in an upper end portion of the third board mounting portion 31.

A switch board 32 is mounted on an exterior surfaces of the first board mounting portion 29 and the second board mounting portion 30. The switch board 32 is bent at a right angle and includes switch portions 32*a*, 32*a*, etc. separately positioned in a longitudinal direction. A connection board 33, for example, a flexible printed wiring board is connected to one end portion of the switch board 32. A microphone 34 is connected to part of the connection board 33. The microphone 34 is placed on the microphone placing portion 31*a* of the third board mounting portion 31.

A control board 35 is mounted on the third board mounting portion 31. The control board 35 functions to perform electrical control on the components of the sound output device 1. Part of the connection board 33 is connected to the control board 35. Thus, the switch board 32 and the microphone 34 are connected to the control board 35 through the connection board 33.

With the chassis 6 placed inside the base placing portion 10, the switch board 32 is positioned to be opposed to an inner surface of the first case portion 8 and the switch portions 32*a*, 32*a*, etc. are at the positions corresponding to the respective button holes 17*a*, 17*a*, 18*a*, 18*a*, and 18*a* of the base placing portion 10. Further, with the chassis 6 placed inside the base placing portion 10, the microphone 34 and the control board 35 are also placed inside the base placing portion 10 and the microphone 34 is at the position corresponding to the microphone hole 16*a* of the base placing portion 10. Note that the microphone hole 16*a* is covered with a waterproof sheet, which is not illustrated, from an inner surface side of the curved surface portion 16, so that the microphone 34 is protected against moisture by the waterproof sheet.

With the microphone 34 and the control board 35 placed inside the base placing portion 10, inside the base placing portion 10, the battery 36 is placed in the battery placing space 6*a*, which is positioned behind the control board 35, of the chassis 6. The battery 36 has a terminal portion, which is not illustrated, and the terminal portion is connected to the control board 35.

A cover sheet 37 made of, for example, silicon is adhered on exterior surfaces of the first planar portion 17 and the second planar portion 18 with waterproof adhesive paper, which is not illustrated. On an exterior surface side of the cover sheet 37, the operation buttons 38, 38, etc. are placed separately in the longitudinal direction of the cover sheet 37. The operation buttons 38, 38, etc. are placed at the positions corresponding to the button holes 17*a*, 17*a*, 18*a*, 18*a*, and 18*a* of the first case portion 8, and partially protrude outward from the respective button placing holes 27*a*, 27*a*, 28*a*, 28*a*, and 28*a* of the second case portion 9 (see FIG. 11). Thus, the operation buttons 38, 38, etc. are arranged while partially protruding from a peripheral surface of the second case portion 9.

When the operation button 38 is pressed, the switch portion 32*a* of the switch board 32 is pressed through the cover sheet 37 and the button hole 17*a* or the button hole 18*a*, and a predetermined function corresponding to the pressed operation button 38 is executed. The switch portion 32*a* of the switch board 32 is pressed through the cover sheet 37 when the operation button 38 is pressed in this way, so that the switch board 32 placed inside the base placing portion 10 is protected against moisture by the cover sheet 37.

Note that the sound output device 1 can receive signals from mobile terminals such as a mobile phone by wireless communication or the like. For example, when a mobile terminal receives an incoming call, the incoming signal is input to the sound output device 1 to allow the user to have, with the caller, a phone conversation over the sound output device 1 by use of the microphone 34.

As the operation buttons 38, 38, etc., for example, four operation buttons 38D, 38C, 38B, and 38A are provided.

With the operation on the operation button 38A, the power can be turned on or off and an incoming call can be answered or ended. With the long press of the operation button 38A, the power can be turned on or off, and with the short press of the operation button 38A, an incoming call can be answered or ended.

With the operation on the operation button 38B, a conversation between a plurality of users (group call) can be made. When the operation button 38B is operated, a group call in a group set in advance is started to make the exchange of conversation in the group possible. When the operation button 38B is operated again, the group call is ended (with regard to the details of group calls, see PCT/JP 2017/43820 by the present applicant).

With the operation on the operation button 38C, the function of a predetermined conversation application can be executed. This conversation application is, for example, an application supporting a conversation between four or more users. When the user speaks while pressing the operation button 38C, the generated voice is transmitted to other users using the sound output devices 1, so that a conversation can be made between the four or more users.

Note that, while the group call function, which is executed with the operation on the operation button 38B, can be executed in a case where the distance between the sound output devices 1 used by the users in the group is equal to or shorter than a certain distance, the function of the conversation application, which is executed with the operation on the operation button 38C, can be executed even in a case where the distance between the sound output devices 1 is longer than the certain distance that the group call function supports.

With the operation on the operation button 38D, the volume can be changed.

Note that, in the sound output device 1, in a case where there is an incoming call, the incoming function can be executed with priority over other sound output to answer the call. For example, in a case where there is an incoming call when a group call is being held, the incoming function can be executed on a priority basis to answer the call. Further, group calls are executed with priority over music reproduction. The sound output device 1 is set such that incoming calls, group calls, and music reproduction are executed in order of priority.

One end portion of an antenna 39 is connected to the control board 35. The antenna 39 is placed on the antenna placing portion 12 (see FIG. 10 and FIG. 12). The antenna 39 functions to receive sound signals.

Charging terminals 40 and 40 are connected to respective surfaces of the control board 35. The charging terminals 40 and 40 protrude in opposite directions from the same portion of the control board 35. The charging terminals 40 and 40 are connected to the terminal portion of the battery 36 through the control board 35. Thus, the charging terminals 40 and 40 are charging terminals for charging the battery 36.

Figure 13:
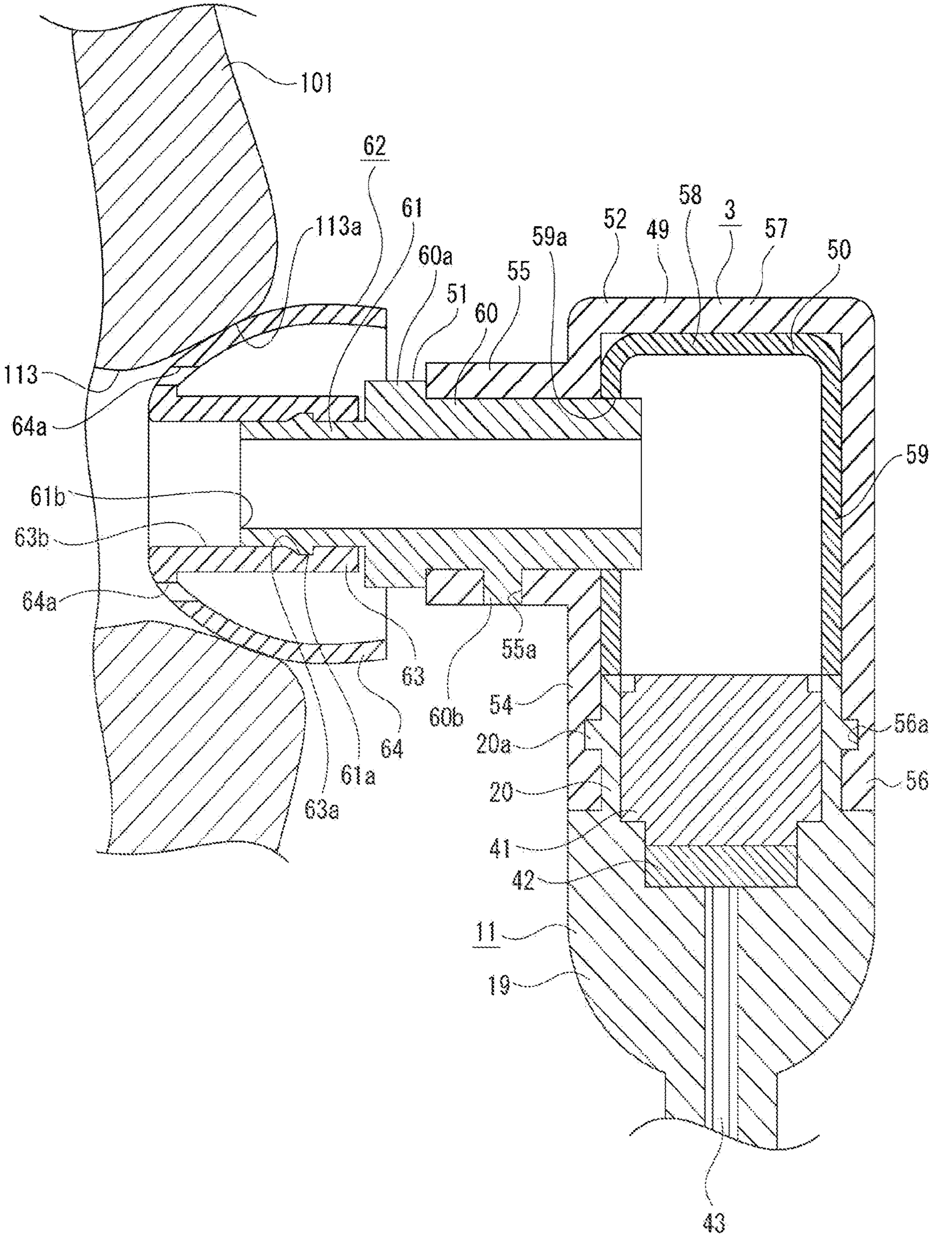
FIG. 13 is a sectional view of the sound output device, illustrating the sound output device and part of the ear.

On the speaker placing portion 11 of the first case portion 8, a speaker 41 configured to output sound on the basis of sound signals received by the antenna 39 and a speaker board 42 for driving the speaker 41 are placed (see FIG. 10 and FIG. 13). The speaker board 42 and the control board 35 are connected to each other by a cable 43. The cable 43 is placed along the antenna 39 inside the antenna placing portion 12.

The cabinet 7 includes a plate-shaped cover portion 44 formed in shape and size corresponding to the base placing portion 10 of the first case portion 8 and a protruding cover portion 45 formed in shape and size corresponding to the antenna placing portion 12 and protruding from the plate-shaped cover portion 44, the plate-shaped cover portion 44 and the protruding cover portion 45 being integrally formed (see FIG. 10). A terminal insertion hole 44*a* is formed in an upper end portion of the plate-shaped cover portion 44.

With regard to the cabinet 7, with the necessary components such as the control board 35, the battery 36, and the antenna 39 placed on the first case portion 8 as described above, the plate-shaped cover portion 44 is laterally joined to the base placing portion 10, and the protruding cover portion 45 is laterally joined to the antenna placing portion 12. The plate-shaped cover portion 44 and the protruding cover portion 45 are joined to the base placing portion 10 and the antenna placing portion 12, respectively, with a UV-curable adhesive, for example. The plate-shaped cover portion 44 and the protruding cover portion 45 are joined to the base placing portion 10 and the antenna placing portion 12, respectively, so that the space between the cabinet 7 and the first case portion 8 is protected against moisture.

With the cabinet 7 joined to the first case portion 8, the first case portion 8 and the second case portion 9 are coupled to each other. Specifically, the base placing portion 10 and the main cover portion 23 are coupled to each other, the speaker placing portion 11 and the speaker cover portion 24 are coupled to each other, and the antenna placing portion 12 and the antenna cover portion 25 are coupled to each other, so that the case 5 is formed. The speaker cover portion 24 is coupled to a lower end portion of the speaker placing portion 11.

With the cabinet 7 joined to the first case portion 8 and with the first case portion 8 and the second case portion 9 coupled to each other, one of the charging terminals 40 is inserted and placed in the terminal placing hole 13*a* formed in the base placing portion 10, and the other charging terminal 40 is inserted and placed in a terminal placing hole 23*a* formed in the second case portion 9 through the terminal insertion hole 44*a* formed in the cabinet 7.

Note that the sound output device 1 includes the charging terminals 40 and 40 provided on the respective sides, such that, irrespective of whether the sound output device 1 which is worn on one of the left ear 100 or the right ear 100 is worn on the left ear 100 or the right ear 100, one of the charging terminals 40 and 40 provided on the respective sides is exposed. Thus, irrespective of whether the sound output device 1 is worn on the left ear 100 or the right ear 100, the sound output device 1 exhibits a similar designability, so that the designability and conspicuity of the sound output device 1 can be enhanced.

In the device main body 2 configured as described above, the base placing portion 10, the main cover portion 23, and the components placed therein are provided as a main device portion 46, the speaker placing portion 11, the speaker cover portion 24, and the components placed therein are provided as a sound output portion 47, and the antenna placing portion 12, the antenna cover portion 25, and the components placed therein are provided as a connection portion 48 for connecting the main device portion 46 and the sound output portion 47 to each other (see FIG. 9).

<Configuration of Joint>

The joint 3 includes a base body 49 made of, for example, a silicon material, an inner member 50 made of, for example, a resin material, and a nozzle 51 made of, for example, a resin material (see FIG. 3, FIG. 10, and FIG. 13). With regard to the joint 3, the base body 49 has a lower hardness than the inner member 50 and the nozzle 51, so that the base body 49 is elastically deformable.

The base body 49 includes a joint main body portion 52 and a support portion 53 that are integrally formed. The joint main body portion 52 includes a first cylindrical portion 54 and a second cylindrical portion 55, and a diameter of the first cylindrical portion 54 is larger than a diameter of the second cylindrical portion 55.

The first cylindrical portion 54 includes a substantially cylindrical detachable portion 56 and a disc-shaped closing portion 57 for closing one axial end of the detachable portion 56. A circumferentially extending receiving groove 56*a* is formed in an inner peripheral portion of the detachable portion 56. The receiving groove 56*a* is formed at a position near an end portion opposite to the closing portion 57.

The second cylindrical portion 55 is formed into a cylindrical shape, has an axial direction orthogonal to an axial direction of the first cylindrical portion 54, and is continuous with the portion of the detachable portion 56 that is positioned near the closing portion 57. The second cylindrical portion 55 has coupling holes 55*a*, 55*a*, and 55*a* formed separately in the circumferential direction. The second cylindrical portion 55 has a central axis S2 not intersecting with a central axis S1 of the first cylindrical portion 54 and is continuous with the portion radially displaced from the central axis S1 of the first cylindrical portion 54 (see FIG. 7). Note that, in FIG. 13, as a matter of convenience, the base body 49 is illustrated with the central axis S1 of the first cylindrical portion 54 and the central axis S2 of the second cylindrical portion 55 intersecting with each other.

An internal space of the first cylindrical portion 54 and an internal space of the second cylindrical portion 55 communicate with each other, and the internal spaces which communicate with each other is formed as a space bent at a right angle (see FIG. 13).

The support portion 53 is formed into a substantially arc shape protruding from the joint main body portion 52. An exterior surface of the support portion 53 is formed as a curved surface as a whole. The support portion 53 is elastically deformable.

The inner member 50 includes a bottom portion 58 facing a substantially up-down direction and a circumferential surface portion 59 protruding substantially downward from a peripheral portion of the bottom portion 58 (see FIG. 3 and FIG. 13). A communication hole 59*a* is formed in the circumferential surface portion 59. The inner member 50 is inserted and fitted into the first cylindrical portion 54 of the base body 49 and functions to reinforce the first cylindrical portion 54. With the inner member 50 inserted into the base body 49, the communication hole 59*a* is matched with the portion where the first cylindrical portion 54 and the second cylindrical portion 55 are continuous with each other.

The nozzle 51 includes a substantially cylindrical large-diameter portion 60 and a substantially cylindrical small-diameter portion 61 that are axially continuous with each other.

A flanged regulation protruding portion 60*a* protruding outward is provided at an end portion on the small-diameter portion 61 side of the large-diameter portion 60. In an axially middle portion of the large-diameter portion 60, coupling protruding portions 60*b*, 60*b*, and 60*b* protruding outward are provided separately in the circumferential direction.

A ring-shaped engagement protruding portion 61*a* protruding outward is provided at an axially middle portion of the small-diameter portion 61. The opening of the small-diameter portion 61 is formed as a sound emitting opening 61*b*.

The nozzle 51 is inserted with the large-diameter portion 60 fitted into the second cylindrical portion 55, thereby functioning to reinforce the second cylindrical portion 55.

With the large-diameter portion 60 inserted into the second cylindrical portion 55, the coupling protruding portions 60*b*, 60*b*, and 60*b* are fitted into the respective coupling holes 55*a*, 55*a*, and 55*a*, so that the nozzle 51 is prevented from dropping out of the second cylindrical portion 55, and the regulation protruding portion 60*a* is in abutment against a distal end surface of the second cylindrical portion 55, and thus, the nozzle 51 is positioned with respect to the second cylindrical portion 55 in an insertion direction. With the large-diameter portion 60 inserted into the second cylindrical portion 55, the large-diameter portion 60 is partially inserted into the communication hole 59*a* of the inner member 50.

The joint main body portion 52 and the nozzle 51 are coupled to each other as described above. Since the joint main body portion 52 is made of a silicon material, in the state where the joint main body portion 52 and the nozzle 51 are coupled to each other, the second cylindrical portion 55 of the joint main body portion 52 is in close contact with an outer side of the large-diameter portion 60 of the nozzle 51. Thus, high waterproof performance between the joint main body portion 52 and the nozzle 51 is achieved.

The first cylindrical portion 54 of the base body 49 of the joint 3 is mounted on the sound output portion 47 of the device main body 2. The first cylindrical portion 54 is mounted on the sound output portion 47 with the mounting cylindrical portion 20 inserted into the detachable portion 56. With the first cylindrical portion 54 mounted on the sound output portion 47, the mounting protruding portion 20*a* of the mounting cylindrical portion 20 is fitted into the receiving groove 56*a*, so that the joint 3 is prevented from dropping out of the device main body 2.

Further, the joint 3 can be removed from the device main body 2 by axially pulling out the first cylindrical portion 54 from the sound output portion 47. When the first cylindrical portion 54 is pulled out from the sound output portion 47, the detachable portion 56 is partially elastically deformed to allow the mounting protruding portion 20*a* to be drawn out from the receiving groove 56*a*.

The joint main body portion 52 of the joint 3 and the sound output portion 47 of the device main body 2 are coupled to each other as described above. Since the joint main body portion 52 is made of a silicon material, in the state where the joint main body portion 52 and the sound output portion 47 are coupled to each other, the first cylindrical portion 54 is in close contact with an outer side of the mounting cylindrical portion 20 of the sound output portion 47. Thus, high waterproof performance between the joint main body portion 52 and the sound output portion 47 is achieved.

In the state where the joint 3 is mounted on the device main body 2, when sound is output from the speaker 41 placed in the sound output portion 47, the output sound is output from the sound emitting opening 61*b* of the nozzle 51 through an internal space of the joint 3. The internal space of the joint 3 is bent at a right angle, so that the sound is output from the speaker 41 to pass through the internal space of the joint 3 which is bent at a right angle to be output from the sound emitting opening 61*b*.

The second cylindrical portion 55 and the support portion 53 of the joint 3A for a right ear have symmetrical shapes to the second cylindrical portion 55 and the support portion 53 of the joint 3 for a left ear about the first cylindrical portion 54 (see FIG. 5 to FIG. 10). The joint 3A is also removably attached to the sound output portion 47 of the device main body 2 like the joint 3.

As described above, the joint 3 and the joint 3A are removably attached to the sound output portion 47 of the device main body 2, and hence, the joint 3 for a left ear or the joint 3A for a right ear can be mounted on the device main body 2 in a replaceable manner.

With the joint 3 or the joint 3A mounted on the device main body 2, the joint 3 or the joint 3A is rotatable with respect to the sound output portion 47 in directions about a virtual axis J extending in the attaching/removing direction (see FIG. 3 and FIG. 4).

An earpad 62 is removably attached to the small-diameter portion 61 of the nozzle 51 of the joint 3 (see FIG. 9, FIG. 10, and FIG. 13). The earpad 62 is made of, for example, a silicon material and is elastically deformable. The earpad 62 includes a cylindrical portion 63 which is substantially cylindrical, and a hole inserting portion 64 which is continuous with one axial end portion of the cylindrical portion 63 and covers an outer side of the cylindrical portion 63, the cylindrical portion 63 and the hole inserting portion 64 being integrally formed. A ring-shaped engagement groove 63*a* is formed in an inner peripheral portion of the cylindrical portion 63. An internal space of the cylindrical portion 63 is formed as a sound passing hole 63*b*. The hole inserting portion 64 has, for example, at an end portion continuous with the cylindrical portion 63, input holes 64*a* and 64*a* formed separately in the circumferential direction.

The cylindrical portion 63 of the earpad 62 is mounted on the small-diameter portion 61 of the nozzle 51. The cylindrical portion 63 is mounted on the small-diameter portion 61 with the small-diameter portion 61 inserted into the cylindrical portion 63. With the cylindrical portion 63 mounted on the small-diameter portion 61, the engagement protruding portion 61*a* of the small-diameter portion 61 is fitted into the engagement groove 63*a*, so that the earpad 62 is prevented from dropping out of the nozzle 51.

Further, the earpad 62 can be removed from the nozzle 51 by axially pulling out the cylindrical portion 63 from the small-diameter portion 61. When the cylindrical portion 63 is pulled out from the small-diameter portion 61, the cylindrical portion 63 is partially elastically deformed to allow the engagement protruding portion 61*a* to be drawn out from the engagement groove 63*a*.

Note that the earpad 62 may be of a type provided with a thin film sheet for closing the opening edge on the hole inserting portion 64 side of the sound passing hole 63*b*. This thin film sheet may be made of, for example, a silicon material and formed integrally with the cylindrical portion 63 and the hole inserting portion 64. The thin film sheet functions to prevent moisture from passing therethrough and to allow sound (sound waves) to pass therethrough.

Thus, with the use of the earpad 62 of the type provided with the thin film sheet, moisture can be prevented from entering the joint 3 from the sound passing hole 63*b*, so that the sound output device 1 can be suitably used even in an environment requiring waterproof.

<Wearing of Sound Output Device on Ear>

Figure 14:
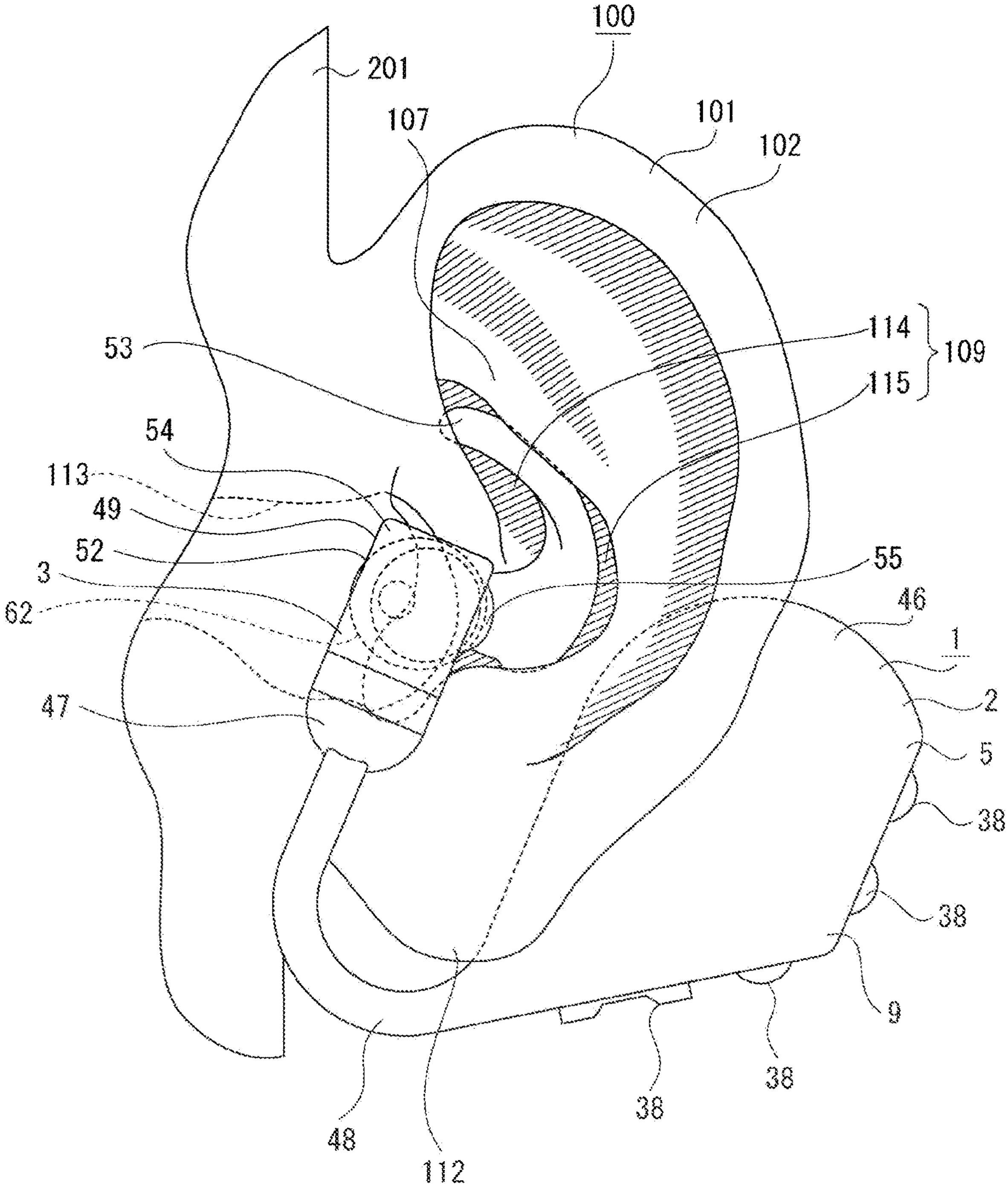
FIG. 14 is a side view illustrating the sound output device worn on the ear.

The sound output device 1 configured as described above is worn on the ear 100 with the support portion 53 of the joint 3 in abutment against the inferior crus of the antihelix 107 from below and the earpad 62 partially inserted into the ear canal 113 from the external acoustic opening 113*a* (see FIG. 13 and FIG. 14).

At this time, since the support portion 53 is made of a silicon material and elastically deformable, the support portion 53 is elastically deformed to match the shape of the inferior crus of the antihelix 107 to be in close contact with at least part of the inferior crus of the antihelix 107 from below. Further, the support portion 53 is entirely inserted into the ear concha 109.

The hole inserting portion 64 of the earpad 62 is in abutment against the opening edge of the external acoustic opening 113*a*. Since the earpad 62 is made of a silicon material and elastically deformable, the earpad 62 is elastically deformed to match the shape of the opening edge of the external acoustic opening 113*a* to be in close contact with the opening edge of the external acoustic opening 113*a*.

With the sound output device 1 worn on the ear 100, an axial direction of the base body 49 of the joint 3 and an axial direction of the sound output portion 47 of the device main body 2 are set to a direction slightly tilted in the front-back direction from the up-down direction, so that sound is output from the speaker 41, which is placed in the sound output portion 47, in an obliquely upward and backward direction. The sound output from the speaker 41 in the obliquely upward and backward direction is output from the sound emitting opening 61*b* of the nozzle 51 toward the ear 100 through the internal space of the joint 3, which is bent at a right angle.

At this time, for the user, sound generated in an external environment is input to the ear canal 113 from the input holes 64*a* and 64*a* formed in the earpad 62, so that the sound generated in the external environment can be heard together with the sound output from the speaker 41.

Thus, the sound output device 1 can be used more safely when the sound output device 1 is used during exercise or walking, or in the vehicle.

Further, with the sound output device 1 worn on the ear 100, the connection portion 48 is positioned to run up along the ear lobe 112, the joint 3 and the sound output portion 47 are positioned in front of the auricle 101, and the main device portion 46 is positioned behind the auricle 101.

At this time, the microphone hole 16*a*, which is formed in the curved surface portion 16 of the main device portion 46 of the device main body 2, is positioned behind the auricle 101. Thus, the auricle 101 is positioned in front of the microphone hole 16*a* as a shield to prevent wind from entering the microphone hole 16*a*. Generation of generally called wind noise, which is generated due to flow of wind, can therefore be prevented, so that the quality of sound that is input to the microphone 34 can be enhanced.

However, the microphone hole 16*a* may be formed in a lower end portion of the device main body 2, for example, in a lower end portion of the main device portion 46 or the connection portion 48. With the microphone hole 16*a* formed in the lower end portion of the device main body 2, entrance of moisture such as rainwater and sweat of the user, from the microphone hole 16*a* is prevented, so that the quality of sound that is input to the microphone 34 can be enhanced.

Further, left and right surfaces of the main device portion 46 of the sound output device 1 may have different colors or the same color.

In the case where the left and right surfaces of the main device portion 46 have different colors, the sound output devices 1 worn on the left ear 100 and the right ear 100 each exhibit different designability, so that the designability and conspicuity of the sound output device 1 can be enhanced. Further, whether to wear the sound output device 1 on the left ear 100 or the right ear 100 can be easily determined by recognizing the colors of the left and right surfaces of the main device portion 46 in advance.

Meanwhile, in the case where the left and right surfaces of the main device portion 46 have the same color, irrespective of whether the sound output device 1 is worn on the left ear 100 or the right ear 100, the sound output device 1 exhibits a similar designability, so that the designability and conspicuity of the sound output device 1 can be enhanced.

Further, stickers, decorations, or the like having various colors, patterns, designs, or the like may be put on the left and right surfaces of the main device portion 46. In this case, the user puts, for example, stickers having his/her favorite colors or the like on the left and right surfaces of the main device portion 46, so that the user can decorate the sound output device 1, depending on the user's preference.

The sound output device 1 includes the control board 35 and the battery 36 placed inside the main device portion 46, and the operation buttons 38, 38, etc. for executing the predetermined functions are placed on the main device portion 46.

Thus, the main device portion 46 includes, in addition to the battery 36, the control board 35 and the operation buttons 38, 38, etc., so that the sound output portion 47 that is positioned in front of the auricle 101 can be reduced in size, and hence, the sound output device 1 hardly comes into the user's view. The sound output device 1 can therefore be worn on the ear 100 more satisfactorily.

Further, the sound output portion 47, which is smaller than the main device portion 46, is positioned in front of the auricle 101 so that the presence of the component on the front side of the auricle 101 becomes weak, with the result that the designability and the conspicuity can be enhanced.

Further, in the sound output device 1, as described above, with the sound output device 1 worn on the ear 100, the output direction of sound from the speaker 41 is set to the obliquely upward and backward direction, and the sound output from the speaker 41 is guided by the joint 3 to the direction different from the output direction.

Thus, the sound output from the speaker 41 in the obliquely upward and backward direction is guided by the joint 3 to the direction different from the output direction to be output from the sound emitting opening 61*b* to the external acoustic opening 113, so that the sound output portion 47, in which the speaker 41 is placed, can be positioned below the external acoustic opening 113. The connection portion 48 can thus be shortened, so that the sound output device 1 can be reduced in size.

In addition, in the sound output device 1, the joint 3 is rotatable with respect to the sound output portion 47 in the directions about the virtual axis J extending in the attaching/removing direction (see FIG. 3 and FIG. 4).

Thus, the angle of the sound emitting opening 61*b* can be adjusted with respect to the sound output portion 47, and the positions of the main device portion 46, the sound output portion 47, and the connection portion 48 with respect to the auricle 101 can be adjusted. The sound output device 1 can therefore be worn on the ear 100 optimally with the sound emitting opening 61*b* and the portions of the device main body 2 set at optimal angles and positions depending on the angle and shape of the ear 100 that are different between individuals.

Still further, the joint 3 includes the joint main body portion 52 formed into a cylindrical shape and the support portion 53 that is formed into a curved shape and hung on the inferior crus of the antihelix 107.

Thus, the joint 3 is held on the ear 100 with the curved support portion 53, which is provided to the joint 3, hung on the inferior crus of the antihelix 107, so that the sound output device 1 can be worn on the ear 100 stably.

Moreover, the support portion 53 that is hung on the inferior crus of the antihelix 107 is elastically deformable.

Thus, the support portion 53 can be elastically deformed to be hung on the inferior crus of the antihelix 107, so that the support portion 53 is stably brought into abutment against the inferior crus of the antihelix 107, irrespective of the shape and size of the ear 100, with the result that the sound output device 1 can be worn on the ear 100 more stably.

Further, the joint 3 includes the cylindrical inner member 50 placed inside the joint main body portion 52, and the hardness of the inner member 50 is higher than the hardness of the joint main body portion 52.

Thus, the joint main body portion 52, which serves as an outer side of the joint 3 and has low hardness, can be brought into contact with the ear 100, and the joint 3 is reinforced by the inner member 50, with the result that the user can be prevented from feeling uncomfortable with the ear 100 when the joint 3 is brought into contact with the ear 100 and the high strength of the joint 3 can be achieved.

Still further, the plurality of operation buttons 38, 38, etc. is placed on the main device portion 46, and the operation buttons 38, 38, etc. are arranged to be adjacent to one another while partially protruding from a peripheral surface of the main device portion 46.

Thus, the user can blindly operate a desired one of the operation buttons 38, 38, etc. by tracing the peripheral surface of the main device portion 46 with his/her finger, so that the high operability of the operation buttons 38, 38, etc. can be achieved.

In addition, the antenna 39 configured to receive sound signals is placed inside the connection portion 48.

Thus, the antenna 39 is placed inside the connection portion 48 that is positioned to run up along the ear lobe 112, so that the antenna 39 is prevented from being covered by the ear 100, and the high functionality of the antenna 39 can therefore be achieved.

Figure 15:
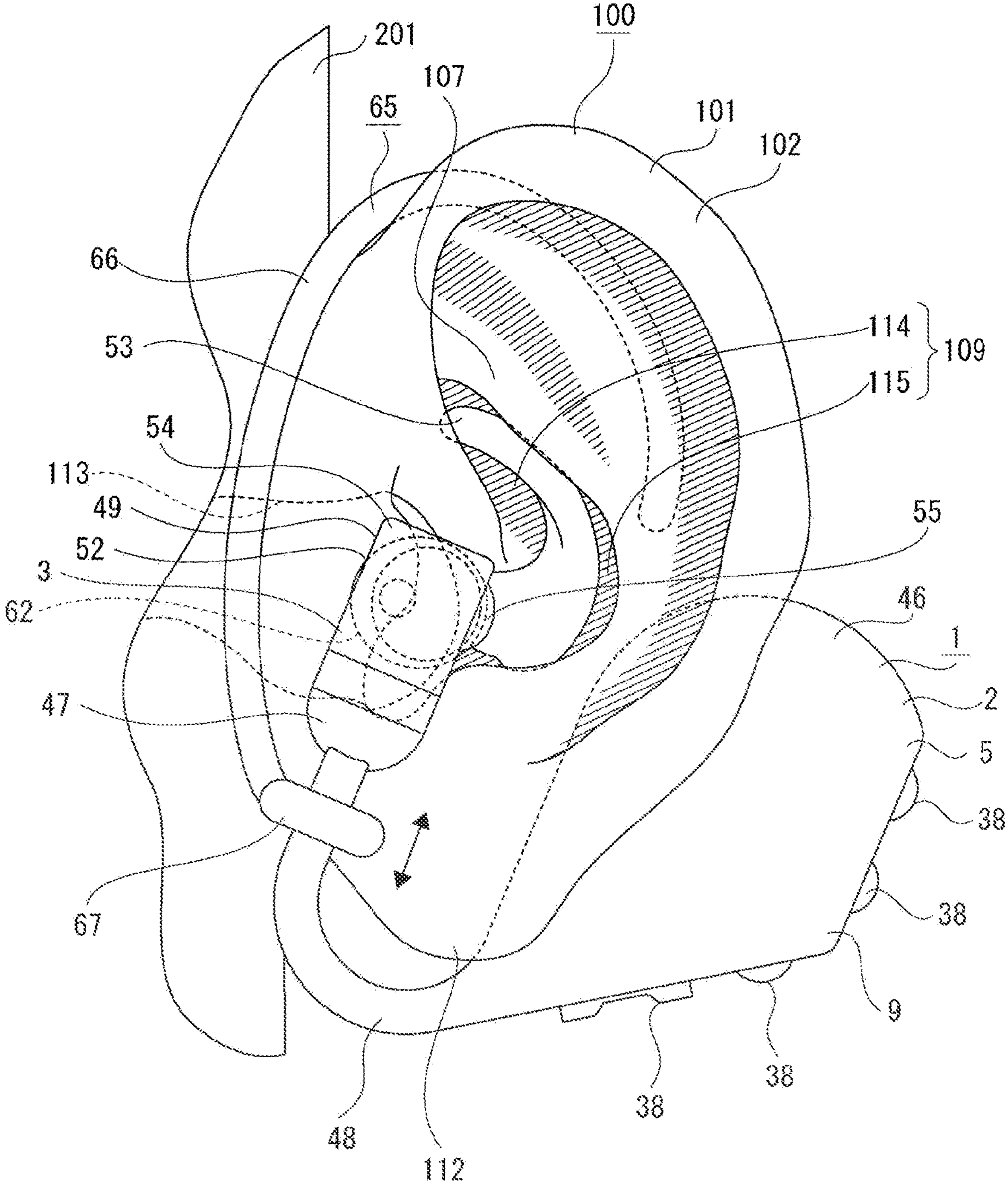
FIG. 15 is a side view illustrating the sound output device worn on the ear with use of a holding supporter.

Note that the sound output device 1 can be suitably used even in a situation where the user is likely to be affected by vibration or vibration is likely to be generated, such as during various exercises (sports) and the driving of vehicles such as a bicycle and a motorcycle, and when the sound output device 1 is used in such a situation, the sound output device 1 can be worn on the ear 100 more stably by use of a holding supporter 65 (see FIG. 15).

The holding supporter 65 is made of, for example, a silicon material and includes a hook portion 66 formed into a curved shape which is curved, and a U-shaped coupling portion 67 continuous with one longitudinal end of the hook portion 66, the hook portion 66 and the coupling portion 67 being integrally formed.

The holding supporter 65 is engaged with the base of the ear 100 near the temporal region 201 from above with the coupling portion 67 coupled to, for example, the connection portion 48 to be fitted thereon and the hook portion 66 partially running down along the helix 102. Further, the coupling portion 67 of the holding supporter 65 is slidable with respect to the connection portion 48, so that the position of the holding supporter 65 with respect to the auricle 101 can be adjusted by sliding the coupling portion 67 with respect to the connection portion 48.

The holding supporter 65 that includes the coupling portion 67 which is coupled to the connection portion 48 and that is positioned to run down along the helix 102 in this way can be used.

Thus, the holding supporter 65 connected to the connection portion 48 can be hung on the base of the ear 100 near the temporal region 201, so that the sound output device 1 is worn on the ear 100 with the support of the holding supporter 65, with the result that the sound output device 1 can be worn on the ear 100 more stably.

Moreover, the coupling portion 67 is slidable with respect to the connection portion 48, so that the position of the holding supporter 65 with respect to the ear 100 can be adjusted by changing the position of the coupling portion 67 with respect to the connection portion 48.

Thus, irrespective of the shape and size of the ear 100 that are different between individuals, the sound output device 1 can be worn on the ear 100 more stably with the holding supporter 65 hung on the base of the ear 100 near the temporal region 201.

Note that the coupling portion 67 of the holding supporter 65 may be coupled to a portion other than the connection portion 48.

<Charging of Battery of Sound Output Device>

Figure 16:
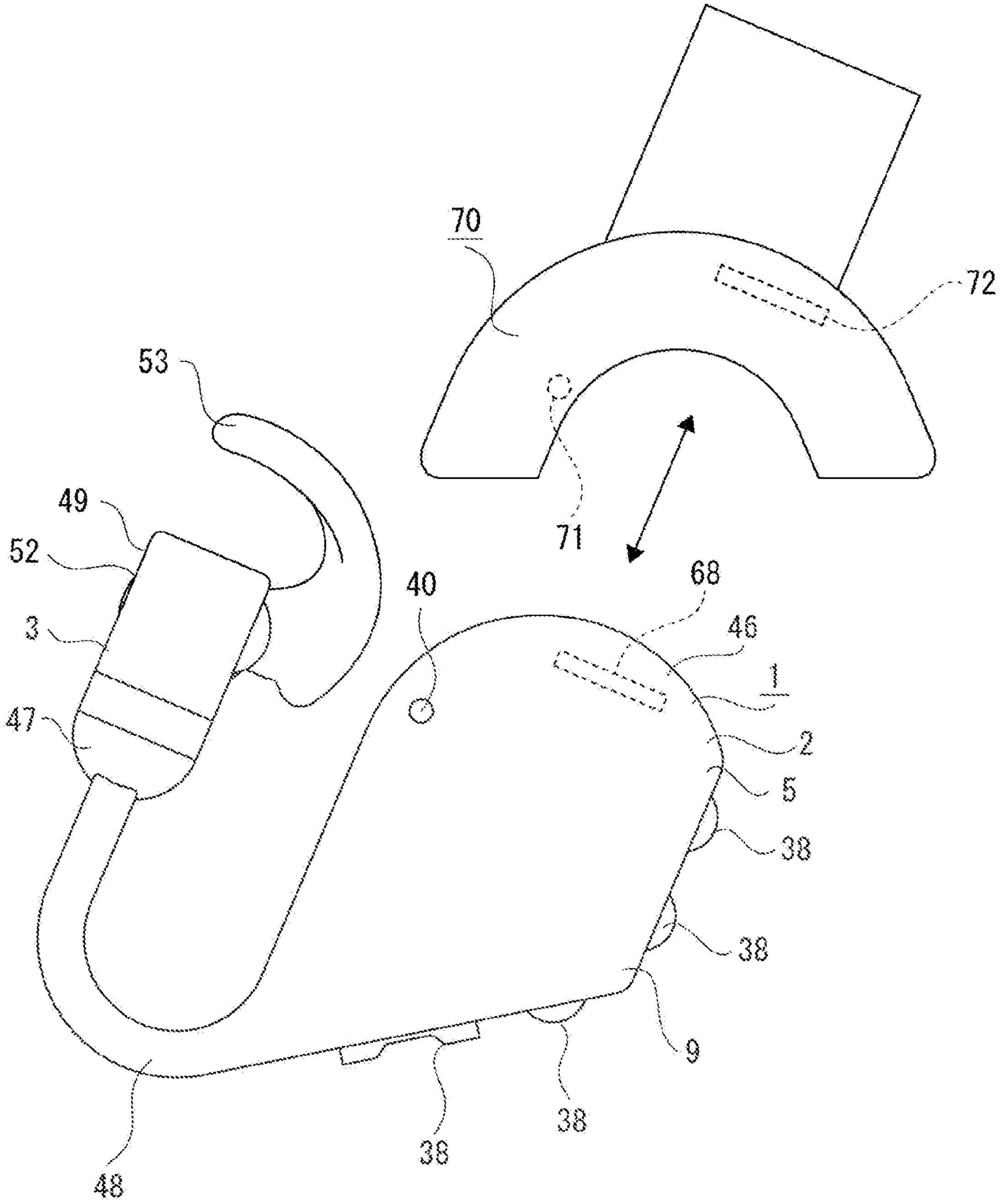
FIG. 16 is a side view illustrating the sound output device and a charger.

The sound output device 1 can be used as a wireless device by charging the battery 36. The battery 36 is charged with a predetermined charger 70, and the charger 70 includes connection terminals 71 and 71 (see FIG. 16).

With the sound output device 1 connected to the charger 70, the charging terminals 40 and 40 of the sound output device 1 are connected to the respective connection terminals 71 and 71. The sound output device 1 is connected when, for example, the main device portion 46 is slid toward the charger 70, and at this time, the charging terminals 40 and 40 are slid toward the respective connection terminals 71 and 71 to be connected thereto. Thus, even in a case where dust or the like adheres to the charging terminals 40 and 40, the dust or the like is removed when the charging terminals 40 and 40 are slid toward the connection terminals 71 and 71, that is, generally called self-cleaning is performed. Consequently, every time the sound output device 1 is connected to the charger 70, the charging terminals 40 and 40 can be satisfactorily connected to the connection terminals 71 and 71.

Moreover, the charger 70 desirably incorporates a magnet 72 and the main device portion 46 desirably incorporates a magnetic member 68 that is attracted to the magnet 72.

With the magnet 72 provided in the charger 70 and with the magnetic member 68 provided in the main device portion 46, when the sound output device 1 is connected to the charger 70, the magnetic member 68 is attracted to the magnet 72, so that the charging terminals 40 and 40 can be easily and positively connected to the connection terminals 71 and 71.

Note that, in the example described above, the charger 70 incorporates the magnet 72, and the main device portion 46 incorporates the magnetic member 68, but in contrast to this, the charger 70 may incorporate a magnetic member, and the main device portion 46 may incorporate a magnet. However, in the case where the main device portion 46 incorporates the magnet, there arises a need to prevent the magnet from affecting the other components placed in the main device portion 46.

<Conclusion>

As described above, the sound output device 1 includes the main device portion 46 that is positioned behind the auricle 101, the sound output portion 47 that is positioned in front of the auricle 101, the connection portion 48 that connects the main device portion 46 and the sound output portion 47 to each other and that is positioned to run up along the ear lobe 112, and the joint 3 that is removably attached to the sound output portion 47, that has the sound emitting opening 61*b*, and that guides sound output from the speaker 41 to the external acoustic opening 113*a*, in which the joint 3 for a left ear or the joint 3A for a right ear is mounted on the sound output portion 47.

Thus, with the joint 3 for a left ear or the joint 3A for a right ear mounted on the sound output portion 47, the sound output device 1 can be worn on one of the left ear 100 or the right ear 100. There is therefore no need to manufacture a left ear-specific sound output device and a right ear-specific sound output device as a pair to provide the sound output devices to users, so that the usability can be enhanced without any manufacturing cost rise.

Moreover, with the sound output device 1 worn on the ear 100, the connection portion 48 is positioned to run up along the ear lobe 112, the joint 3 and the sound output portion 47 are positioned in front of the auricle 101, and the main device portion 46 is positioned behind the auricle 101.

Thus, none of the components of the sound output device 1 is positioned above the auricle 100, so that, in a state where, for example, glasses are worn on the head 100, the sound output device 1 does not interfere with the glasses. The sound output device 1 provides a comfortable wearing experience even when being used together with glasses without causing any trouble on using the glasses, and hence, the usability of the sound output device 1 can be more enhanced.

Further, as described above, the ears 100 of humans are different in shape, size, and angle between individuals, and it is known that, when the distance A from the center P of the external acoustic opening 113*a* to the upper end of the helix 102 and the distance B from the center P to the lower end of the ear lobe 112 are compared to each other, the distance B has a smaller individual difference than the distance A (see FIG. 1).

Thus, with the configuration in which the connection portion 48 is positioned to run up along the ear lobe 112, a coverage rate of users who can wear the sound output device 1 is high, so that the sound output device 1 can be used with satisfactory wearability, irrespective of differences in shape, size, and angle of the ear 100.

In addition, since the joint main body portion 52 and the support portion 53 of the joint 3 are integrally formed, the joint main body portion 52 and the support portion 53 are not provided as individual components, so that the number of components is reduced, and the manufacturing cost of the sound output device 1 can therefore be reduced.

<Present Technology>

The present technology can take the following configurations.

(1)

A sound output device including:

a main device portion that incorporates at least a battery and that is positioned behind an auricle;

a sound output portion that incorporates at least a speaker and that is positioned in front of the auricle;

a connection portion that connects the main device portion and the sound output portion to each other and that is positioned to run up along an ear lobe; and a joint that is removably attached to the sound output portion, that has a sound emitting opening, and that guides sound output from the speaker to an external acoustic opening, in which the joint for one of a left ear or a right ear is mounted on the sound output portion.

(2)

The sound output device according to Item (1), in which the joint is rotatable with respect to the sound output portion in a direction about a virtual axis extending in an attaching/removing direction.

(3)

The sound output device according to Item (1) or (2), in which an output direction of the sound from the speaker is set to an obliquely upward and backward direction, and the sound output from the speaker is guided by the joint to a direction different from the output direction.

(4)

The sound output device according to any one of Items (1) to (3), in which the joint includes a joint main body portion formed into a cylindrical shape and a support portion that is formed into a curved shape and that is hung on an inferior crus of an antihelix.

(5)

The sound output device according to Item (4), in which the joint main body portion and the support portion are integrally formed.

(6)

The sound output device according to Item (4) or (5), in which the support portion is elastically deformable.

(7)

The sound output device according to any one of Items (4) to (6), in which the joint includes a cylindrical inner member that is placed inside the joint main body portion, and hardness of the inner member is higher than hardness of the joint main body portion.

(8)

The sound output device according to any one of Items (1) to (7), in which a control board is placed inside the main device portion, and an operation button for executing a predetermined function is placed on the main device portion.

(9)

The sound output device according to Item (8), in which a plurality of the operation buttons is placed on the main device portion, and the plurality of the operation buttons is arranged to be adjacent to one another while partially protruding from a peripheral surface of the main device portion.

(10)

The sound output device according to any one of Items (1) to (9)

in which an antenna configured to receive a sound signal is placed inside the connection portion.

(11)

The sound output device according to any one of Items (1) to (10), in which a holding supporter that includes a coupling portion coupled to the connection portion and that is positioned to run down along a helix is provided.

(12)

The sound output device according to Item (11), in which the coupling portion is slidable with respect to the connection portion.

(13)

The sound output device according to any one of Items (1) to (12), in which the main device portion includes a charging terminal that is connected to a connection terminal of a charger, the charger includes a magnet, and the main device portion includes a magnetic member that is attracted to the magnet.

(14)

The sound output device according to any one of Items (1) to (13), in which an earpad is removably attached to the joint, and the earpad has formed therein a sound passing hole that functions as a passage for sound output from the sound emitting opening and an input hole capable of receiving external sound.

REFERENCE SIGNS LIST

100: Ear
101: Auricle
107: Inferior crus of antihelix
112: Ear lobe
1: Sound output device
3: Joint
35: Control board
36: Battery
38: Operation button
39: Antenna
40: Charging terminal
41: Speaker
46: Main device portion
47: Sound output portion
48: Connection portion
50: Inner member
52: Joint main body portion
53: Support portion
**61*b***: Sound emitting opening
62: Earpad
**63*b***: Sound passing hole
**64*a***: Input hole
65: Holding supporter
67: Coupling portion
68: Magnetic member
70: Charger
71: Connection terminal
72: Magnet

The invention claimed is:

1. A sound output device, comprising:

a main device portion that includes at least a battery, wherein the main device portion is configured to be positioned behind an auricle of an ear of a user with the sound output device worn on the ear;

a sound output portion that includes at least a speaker, wherein the sound output portion is configured to be positioned in front of the auricle with the sound output device worn on the ear, and the sound output portion includes:

a base cylindrical portion; and a mounting cylindrical portion that protrudes from the base cylindrical portion;

a connection portion that connects the main device portion with the sound output portion, wherein the connection portion is configured to be positioned to run up along an ear lobe of the ear with the sound output device worn on the ear; and a joint that is removably attached to the sound output portion, wherein the joint has a sound emitting opening, the joint guides sound output from the speaker to an external acoustic opening, the joint for one of a left ear or a right ear is mounted on the sound output portion, the joint includes a joint main body portion formed into a cylindrical shape, the joint main body portion includes a detachable portion that is partially elastic, the joint main body portion is configured to be mounted on the sound output portion based on insertion of the mounting cylindrical portion of the sound output portion into the detachable portion of the joint main body, the joint is configured to be removed from the sound output portion based on axial pull out of the joint main body of the joint from the sound output portion, the detachable portion of the joint is configured to partially elastically deform based on the axial pull out of the joint main body of the joint from the sound output portion, and the mounting cylindrical portion of the sound output portion is configured to be drawn out from the detachable portion of the joint main body based on the partially elastically deformed detachable portion.

2. The sound output device according to claim 1, wherein the joint is rotatable with respect to the sound output portion in a direction about a virtual axis that extends in an attaching/removing direction of the Pint.

3. The sound output device according to claim 1, wherein an output direction of the sound output from the speaker is set to an obliquely upward and backward direction, and the sound output from the speaker is guided by the joint to a direction different from the output direction.

4. The sound output device according to claim 1, wherein the joint further includes a support portion that has a curved shape, and the support portion is hung on an inferior crus of an antihelix of the ear with the sound output device worn on the ear.

5. The sound output device according to claim 4, wherein the joint main body portion and the support portion are integrally formed.

6. The sound output device according to claim 4, wherein the support portion is elastically deformable.

7. The sound output device according to claim 4, wherein the joint further includes a cylindrical inner member that is inside the joint main body portion, and hardness of the cylindrical inner member is higher than hardness of the joint main body portion.

8. The sound output device according to claim 1, wherein the sound output device further comprises:

a control board inside the main device portion; and an operation button configured to execute a function, wherein the operation button is on the main device portion.

9. The sound output device according to claim 8, wherein the sound output device further comprises a plurality of the operation buttons on the main device portion, and the plurality of the operation buttons is adjacent to one another and partially protrudes from a peripheral surface of the main device portion.

10. The sound output device according to claim 1, wherein the sound output device further comprises an antenna configured to receive a sound signal, and the antenna is inside the connection portion.

11. The sound output device according to claim 1, wherein the sound output device further comprises a holding supporter that includes a coupling portion coupled to the connection portion, and the holding supporter runs down along a helix of the ear with the sound output device worn on the ear.

12. The sound output device according to claim 11, wherein the coupling portion is slidable with respect to the connection portion.

13. The sound output device according to claim 1, wherein the main device portion includes a charging terminal configured to connect to a connection terminal of a charger, the charger includes a magnet, and the main device portion further includes a magnetic member configured to be attracted to the magnet.

14. The sound output device according to claim 1, wherein an earpad is removably attached to the joint, and the earpad includes:

a sound passing hole configured to function as a passage for sound output from the sound emitting opening; and an input hole configured to receive external sound.

* * * * *